United States Patent
Bushnell et al.

(10) Patent No.: US 12,086,331 B2
(45) Date of Patent: *Sep. 10, 2024

(54) CAPACITIVE GAP SENSOR RING FOR AN INPUT DEVICE

(71) Applicant: Apple Inc., Cupertino, CA (US)

(72) Inventors: Tyler S. Bushnell, Mountain View, CA (US); Collin R. Petty, San Francisco, CA (US); Adam T. Clavelle, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,020

(22) Filed: Sep. 22, 2022

(65) Prior Publication Data

US 2023/0012897 A1   Jan. 19, 2023

Related U.S. Application Data

(63) Continuation of application No. 17/187,429, filed on Feb. 26, 2021, now Pat. No. 11,513,613, which is a (Continued)

(51) Int. Cl.
| | |
|---|---|
| *G06F 3/0338* | (2013.01) |
| *G04C 3/00* | (2006.01) |
| *G04G 21/08* | (2010.01) |
| *G06F 1/16* | (2006.01) |
| *G06F 3/0354* | (2013.01) |
| *G06F 3/0362* | (2013.01) |
| *G06F 3/044* | (2006.01) |

(52) U.S. Cl.
CPC ......... *G06F 3/0338* (2013.01); *G04C 3/005* (2013.01); *G04C 3/007* (2013.01); *G04G 21/08* (2013.01);
(Continued)

(58) Field of Classification Search
CPC ...... G06F 1/163; G06F 3/0338; G06F 3/0362; G06F 3/044–0448; G04C 3/005; G04C 3/007; G04G 21/08
See application file for complete search history.

(56) References Cited

U.S. PATENT DOCUMENTS

| | | |
|---|---|---|
| 2,237,860 A | 4/1941 | Bolle |
| 2,288,215 A | 6/1942 | Taubert et al. |
| (Continued) | | |

FOREIGN PATENT DOCUMENTS

| | | |
|---|---|---|
| CH | 1888928 | 1/1937 |
| CN | 1302740 | 9/2001 |
| (Continued) | | |

OTHER PUBLICATIONS

Author Unknown, "Desirable Android Wear smartwatch from LG," Gulf News, Dubai, 3 pages, Jan. 30, 2015.
(Continued)

*Primary Examiner* — Patrick F Marinelli

(74) *Attorney, Agent, or Firm* — Brownstein Hyatt Farber Schreck, LLP

(57) ABSTRACT

An input mechanism for a portable electronic device includes a rotational manipulation mechanism, such as a cap or shaft. The input mechanism also includes a sensor having first capacitive elements coupled to the manipulation mechanism, second capacitive elements, and a dielectric positioned between the first and second capacitive elements. Movement of the manipulation mechanism alters the positions of the first and second capacitive elements with respect to each other and is determinable based on capacitance changes resulting therefrom. In some implementations, the second capacitive elements may be part of an inner ring or partial ring nested at least partially within an outer ring or partial ring.

20 Claims, 16 Drawing Sheets

Related U.S. Application Data continuation of application No. 16/708,064, filed on Dec. 9, 2019, now Pat. No. 10,955,937, which is a continuation of application No. 16/442,665, filed on Jun. 17, 2019, now Pat. No. 10,509,486, which is a continuation of application No. 16/055,359, filed on Aug. 6, 2018, now Pat. No. 10,379,629, which is a continuation of application No. 15/210,917, filed on Jul. 15, 2016, now Pat. No. 10,061,399.

(52) U.S. Cl.
CPC .......... *G06F 1/163* (2013.01); *G06F 3/03547* (2013.01); *G06F 3/0362* (2013.01); *G06F 3/0446* (2019.05); *G06F 2203/0339* (2013.01); *G06F 2203/04105* (2013.01)

(56) References Cited

U.S. PATENT DOCUMENTS

| | | |
|---|---|---|
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 3,937,002 A | 2/1976 | Van Haften |
| 4,007,347 A | 2/1977 | Haber |
| 4,031,341 A | 6/1977 | Wuthrich et al. |
| 4,037,068 A | 7/1977 | Gaynor |
| 4,051,665 A | 10/1977 | Arn |
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,274,152 A | 6/1981 | Ikegami |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,448,199 A | 5/1984 | Schmid |
| 4,520,306 A | 5/1985 | Kirby |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,001,687 A | 3/1991 | Brien |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,559,761 A | 9/1996 | Frenkel et al. |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,738,104 A | 4/1998 | Lo |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,128,006 A | 10/2000 | Rosenberg et al. |
| 6,134,189 A | 10/2000 | Carrard |
| 6,154,201 A | 11/2000 | Levin et al. |
| 6,175,679 B1 | 1/2001 | Veligdan et al. |
| 6,203,190 B1 | 3/2001 | Stotz |
| 6,241,684 B1 | 6/2001 | Amano |
| 6,246,050 B1 | 6/2001 | Tullis et al. |
| 6,252,825 B1 * | 6/2001 | Perotto ............... G04G 21/08 368/185 |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 | 4/2002 | Isikawa |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,636,197 B1 | 10/2003 | Goldenberg et al. |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,950,695 B2 | 9/2005 | Chen |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,987,568 B2 | 1/2006 | Dana |
| 6,998,553 B2 | 2/2006 | Hisamune et al. |
| 7,009,915 B2 | 3/2006 | Brewer et al. |
| 7,016,263 B2 | 3/2006 | Gueissaz et al. |
| 7,021,442 B2 | 4/2006 | Borgerson |
| 7,031,228 B2 | 4/2006 | Born et al. |
| 7,034,237 B2 | 4/2006 | Ferri et al. |
| 7,081,905 B1 | 7/2006 | Raghunath et al. |
| 7,102,626 B2 | 9/2006 | Denny, III |
| 7,106,307 B2 | 9/2006 | Cok |
| 7,111,365 B1 | 9/2006 | Howie, Jr. |
| 7,113,450 B2 | 9/2006 | Plancon et al. |

(56) References Cited

U.S. PATENT DOCUMENTS

| | | |
|---|---|---|
| 7,119,289 B2 | 10/2006 | Lacroix |
| 7,135,673 B2 | 11/2006 | Saint Clair |
| 7,167,083 B2 | 1/2007 | Giles |
| 7,187,359 B2 | 3/2007 | Numata |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,474,592 B2 | 1/2009 | Lyon |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,587 B2 | 9/2010 | Kosugi |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,405,618 B2 | 3/2013 | Colgate |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,624,836 B1 | 1/2014 | Miller et al. |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,717,151 B2 | 5/2014 | Forutanpour et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,810,514 B2 | 8/2014 | Zhao et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,851,372 B2 | 10/2014 | Zhou |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,049,998 B2 | 6/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,091,309 B2 | 7/2015 | Battlogg |
| 9,100,493 B1 | 8/2015 | Zhou |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,807 B2 | 9/2015 | Shaw et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,350,850 B2 | 5/2016 | Pope et al. |
| 9,367,146 B2 | 6/2016 | Piot |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,501,044 B2 | 11/2016 | Jackson et al. |
| 9,520,100 B2 | 12/2016 | Houjou et al. |
| 9,532,723 B2 | 1/2017 | Kim |

(56) References Cited

U.S. PATENT DOCUMENTS

| | | |
|---|---|---|
| 9,542,016 B2 | 1/2017 | Armstrong-Muntner |
| 9,545,541 B2 | 1/2017 | Aragones et al. |
| 9,552,023 B2 | 1/2017 | Joo et al. |
| 9,599,964 B2 | 3/2017 | Gracia |
| 9,600,071 B2 | 3/2017 | Rothkopf |
| 9,607,505 B2 | 3/2017 | Rothkopf et al. |
| 9,620,312 B2 | 4/2017 | Ely et al. |
| 9,627,163 B2 | 4/2017 | Ely |
| 9,632,318 B2 | 4/2017 | Goto et al. |
| 9,632,537 B2 | 4/2017 | Memering |
| 9,638,587 B2 | 5/2017 | Marquas et al. |
| 9,651,922 B2 | 5/2017 | Hysek et al. |
| 9,659,482 B2 | 5/2017 | Yang et al. |
| 9,680,831 B2 | 6/2017 | Jooste et al. |
| 9,709,956 B1 | 7/2017 | Ely et al. |
| 9,753,436 B2 | 9/2017 | Ely et al. |
| D800,172 S | 10/2017 | Akana |
| 9,800,717 B2 | 10/2017 | Ma et al. |
| 9,836,025 B2 | 12/2017 | Ely et al. |
| 9,873,711 B2 | 1/2018 | Hoover et al. |
| 9,874,945 B2 | 1/2018 | Fukumoto |
| 9,886,006 B2 | 2/2018 | Ely et al. |
| 9,891,590 B2 | 2/2018 | Shim et al. |
| 9,891,651 B2 | 2/2018 | Jackson et al. |
| 9,891,667 B2 | 2/2018 | Jung et al. |
| 9,898,032 B2 | 2/2018 | Hafez et al. |
| 9,913,591 B2 | 3/2018 | Lapetina et al. |
| 9,921,548 B2 | 3/2018 | Mitani |
| 9,927,902 B2 | 3/2018 | Burr et al. |
| 9,939,923 B2 | 4/2018 | Sharma |
| 9,946,297 B2 | 4/2018 | Nazzaro et al. |
| 9,952,558 B2 | 4/2018 | Ely |
| 9,952,682 B2 | 4/2018 | Zhang et al. |
| 9,971,305 B2 | 5/2018 | Ely et al. |
| 9,971,405 B2 | 5/2018 | Salo et al. |
| 9,971,407 B2 | 5/2018 | Holenarsipur et al. |
| 9,979,426 B2 | 5/2018 | Na et al. |
| 10,001,817 B2 | 6/2018 | Zambetti et al. |
| 10,012,550 B2 | 7/2018 | Yang |
| 10,018,966 B2 | 7/2018 | Ely et al. |
| 10,019,097 B2 | 7/2018 | Ely et al. |
| 10,037,006 B2 | 7/2018 | Ely |
| 10,037,081 B2 | 7/2018 | Grant |
| 10,048,802 B2 | 8/2018 | Shedletsky |
| 10,057,470 B2 | 8/2018 | Sangeun |
| 10,061,399 B2 * | 8/2018 | Bushnell ................ G06F 3/0338 |
| 10,066,970 B2 | 9/2018 | Gowreesunker et al. |
| 10,092,203 B2 | 10/2018 | Mirov |
| 10,108,016 B2 | 10/2018 | Bosveld |
| 10,114,342 B2 | 10/2018 | Kim et al. |
| 10,145,711 B2 | 12/2018 | Boonsom et al. |
| 10,175,652 B2 | 1/2019 | Ely et al. |
| 10,190,891 B1 | 1/2019 | Rothkopf et al. |
| 10,191,455 B2 | 1/2019 | Shim et al. |
| 10,203,662 B1 | 2/2019 | Lin et al. |
| 10,209,148 B2 | 2/2019 | Lyon et al. |
| 10,216,147 B2 | 2/2019 | Ely et al. |
| 10,222,755 B2 | 3/2019 | Coakley et al. |
| 10,222,756 B2 | 3/2019 | Ely et al. |
| 10,222,909 B2 | 3/2019 | Shedletsky et al. |
| 10,234,828 B2 | 3/2019 | Ely et al. |
| 10,241,593 B2 | 3/2019 | Chen |
| 10,296,125 B2 | 5/2019 | Ely et al. |
| 10,331,081 B2 | 6/2019 | Ely et al. |
| 10,331,082 B2 | 6/2019 | Ely et al. |
| 10,332,111 B2 | 6/2019 | Mokhasi et al. |
| 10,353,487 B2 | 7/2019 | Chung et al. |
| 10,379,629 B2 * | 8/2019 | Bushnell ................ G04G 21/08 |
| 10,386,940 B2 | 8/2019 | Kim |
| 10,401,961 B2 | 9/2019 | Cruz-Hernandez et al. |
| 10,429,959 B2 | 10/2019 | Battlogg |
| 10,474,194 B1 | 11/2019 | Ell et al. |
| 10,503,258 B2 | 12/2019 | Holenarsipur et al. |
| 10,509,486 B2 * | 12/2019 | Bushnell ................ G06F 3/0446 |
| 10,524,671 B2 | 1/2020 | Lamego |
| 10,534,320 B2 | 1/2020 | Ferri et al. |
| 10,534,900 B2 | 1/2020 | Cheong et al. |
| 10,551,798 B1 | 2/2020 | Bushnell et al. |
| 10,572,053 B2 | 2/2020 | Ely et al. |
| 10,579,090 B2 | 3/2020 | Jackson et al. |
| 10,593,617 B2 | 3/2020 | Ashikaga et al. |
| 10,599,101 B2 | 3/2020 | Rothkopf et al. |
| 10,610,157 B2 | 4/2020 | Pandya et al. |
| 10,613,685 B2 | 4/2020 | Shedletsky |
| 10,627,783 B2 | 4/2020 | Rothkopf et al. |
| 10,655,988 B2 | 5/2020 | Boonsom et al. |
| 10,664,074 B2 | 5/2020 | Moussette et al. |
| 10,732,571 B2 | 8/2020 | Ely et al. |
| 10,765,019 B2 | 9/2020 | Werner |
| 10,840,041 B1 | 11/2020 | Harms |
| 10,845,764 B2 | 11/2020 | Ely et al. |
| 10,852,700 B2 | 12/2020 | Abramov |
| 10,852,855 B2 | 12/2020 | Niu |
| 10,871,385 B2 | 12/2020 | Kok |
| 10,936,071 B2 | 3/2021 | Pandya et al. |
| 10,948,880 B2 | 3/2021 | Ely et al. |
| 10,955,937 B2 * | 3/2021 | Bushnell ................ G04C 3/007 |
| 10,962,930 B2 | 3/2021 | Ely et al. |
| 10,962,935 B1 | 3/2021 | Ely et al. |
| 10,987,054 B2 | 4/2021 | Pandya et al. |
| 11,000,193 B2 | 5/2021 | Tal et al. |
| 11,002,572 B2 | 5/2021 | Boonsom et al. |
| 11,029,831 B2 | 6/2021 | Block et al. |
| 11,036,318 B2 | 6/2021 | Kuboyama |
| 11,148,292 B2 | 10/2021 | Bryner et al. |
| 11,194,298 B2 * | 12/2021 | Roach ................ G04G 21/025 |
| 11,194,299 B1 | 12/2021 | Taylor et al. |
| 11,347,189 B1 | 5/2022 | Herrera et al. |
| 11,347,351 B2 | 6/2022 | Shedletsky et al. |
| 11,350,869 B2 | 6/2022 | Rasmussen et al. |
| 11,513,613 B2 * | 11/2022 | Bushnell ................ G06F 1/163 |
| 11,567,457 B2 | 1/2023 | Rothkopf et al. |
| 11,669,205 B2 | 6/2023 | Shedletsky et al. |
| 11,754,981 B2 | 9/2023 | Perkins et al. |
| 11,815,860 B2 | 11/2023 | Pandya et al. |
| 2002/0101457 A1 | 8/2002 | Lang |
| 2003/0174590 A1 | 9/2003 | Arikawa et al. |
| 2004/0047244 A1 | 3/2004 | Iino et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2005/0088417 A1 | 4/2005 | Mulligan |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0182708 A1 | 8/2007 | Poupyrev et al. |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0242569 A1 | 10/2007 | Inoue |
| 2007/0247421 A1 | 10/2007 | Orsley et al. |
| 2008/0130914 A1 | 6/2008 | Cho |
| 2008/0181059 A1 | 7/2008 | Wai |
| 2008/0185272 A1 | 8/2008 | Otani et al. |
| 2009/0051649 A1 | 2/2009 | Rondel |
| 2009/0073119 A1 | 3/2009 | Le et al. |
| 2009/0115748 A1 | 5/2009 | Tanaka et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2009/0312655 A1 | 12/2009 | Lo |
| 2010/0033430 A1 | 2/2010 | Kakutani et al. |
| 2010/0053468 A1 | 3/2010 | Havrill |
| 2010/0079225 A1 | 4/2010 | Washizu et al. |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |

(56) References Cited

U.S. PATENT DOCUMENTS

| | | |
|---|---|---|
| 2011/0249378 A1 | 10/2011 | Yoo |
| 2011/0270358 A1 | 11/2011 | Davis et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1 | 1/2014 | Gillespie |
| 2014/0045547 A1 | 2/2014 | Singamsetty et al. |
| 2014/0071098 A1 | 3/2014 | You |
| 2014/0073486 A1 | 3/2014 | Ahmed et al. |
| 2014/0132516 A1 | 5/2014 | Tsai et al. |
| 2014/0143784 A1 | 5/2014 | Mistry |
| 2014/0197936 A1 | 7/2014 | Biggs et al. |
| 2014/0340318 A1 | 11/2014 | Stringer et al. |
| 2014/0347289 A1 | 11/2014 | Suh et al. |
| 2014/0368442 A1 | 12/2014 | Vahtola |
| 2014/0375579 A1 | 12/2014 | Fujiwara |
| 2015/0026647 A1 | 1/2015 | Park et al. |
| 2015/0041289 A1 | 2/2015 | Ely et al. |
| 2015/0049059 A1 | 2/2015 | Zadesky et al. |
| 2015/0098309 A1 | 4/2015 | Adams et al. |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0293592 A1 | 10/2015 | Cheong |
| 2015/0320346 A1 | 11/2015 | Chen |
| 2015/0338642 A1 | 11/2015 | Sanford |
| 2015/0341031 A1 | 11/2015 | Marquas et al. |
| 2015/0366098 A1 | 12/2015 | Lapetina et al. |
| 2016/0018846 A1 | 1/2016 | Zenoff |
| 2016/0054813 A1 | 2/2016 | Shediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0098016 A1* | 4/2016 | Ely ................. G04G 21/00 368/308 |
| 2016/0109861 A1 | 4/2016 | Kim et al. |
| 2016/0116306 A1 | 4/2016 | Ferri et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0241688 A1 | 8/2016 | Vossoughi |
| 2016/0253487 A1 | 9/2016 | Sarkar et al. |
| 2016/0306446 A1 | 10/2016 | Chung et al. |
| 2016/0320583 A1 | 11/2016 | Hall, Jr. |
| 2016/0327911 A1 | 11/2016 | Eim et al. |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2016/0378071 A1 | 12/2016 | Rothkopf et al. |
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0045958 A1 | 2/2017 | Battlogg et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0089735 A1 | 3/2017 | Ruh |
| 2017/0090599 A1 | 3/2017 | Kuboyama |
| 2017/0104902 A1 | 4/2017 | Kim et al. |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0238138 A1 | 8/2017 | Aminzade |
| 2017/0251561 A1 | 8/2017 | Fleck et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0319082 A1 | 11/2017 | Sayme |
| 2017/0331869 A1 | 11/2017 | Bendahan et al. |
| 2017/0357465 A1 | 12/2017 | Dzeryn et al. |
| 2018/0018026 A1* | 1/2018 | Bushnell ............. G06F 3/0338 |
| 2018/0059624 A1 | 3/2018 | James |
| 2018/0136686 A1 | 5/2018 | Jackson et al. |
| 2018/0196517 A1 | 7/2018 | Tan et al. |
| 2018/0225701 A1 | 8/2018 | Han |
| 2018/0235491 A1 | 8/2018 | Bayley et al. |
| 2018/0239306 A1 | 8/2018 | Ely |
| 2018/0337551 A1 | 11/2018 | Park |
| 2018/0341342 A1* | 11/2018 | Bushnell ............... G04G 21/08 |
| 2019/0017846 A1 | 1/2019 | Boonsom et al. |
| 2019/0025940 A1 | 1/2019 | Shim et al. |
| 2019/0056700 A1 | 2/2019 | Matsuno |
| 2019/0072911 A1 | 3/2019 | Ely et al. |
| 2019/0072912 A1 | 3/2019 | Pandya et al. |
| 2019/0082547 A1 | 3/2019 | Werner et al. |
| 2019/0088583 A1 | 3/2019 | Ashikaga et al. |
| 2019/0146415 A1 | 5/2019 | Ely et al. |
| 2019/0163324 A1 | 5/2019 | Shedletsky |
| 2019/0250754 A1 | 8/2019 | Ely et al. |
| 2019/0278232 A1 | 9/2019 | Ely et al. |
| 2019/0294117 A1 | 9/2019 | Ely et al. |
| 2019/0302902 A1* | 10/2019 | Bushnell ............... G06F 3/0446 |
| 2019/0317454 A1 | 10/2019 | Holenarsipur et al. |
| 2019/0391539 A1 | 12/2019 | Perkins et al. |
| 2020/0041962 A1 | 2/2020 | Beyhs |
| 2020/0064774 A1 | 2/2020 | Ely et al. |
| 2020/0064779 A1 | 2/2020 | Pandya et al. |
| 2020/0073339 A1* | 3/2020 | Roach .................... G04G 17/08 |
| 2020/0085331 A1 | 3/2020 | Chou |
| 2020/0110473 A1* | 4/2020 | Bushnell ............... G06F 3/0338 |
| 2020/0150815 A1 | 5/2020 | Ely et al. |
| 2020/0159172 A1* | 5/2020 | Bushnell .................. G04B 3/04 |
| 2020/0233380 A1 | 7/2020 | Rothkopf |
| 2020/0233529 A1 | 7/2020 | Shedletsky et al. |
| 2020/0271483 A1 | 8/2020 | Boonsom |
| 2020/0310609 A1 | 10/2020 | Ham |
| 2020/0326659 A1 | 10/2020 | Ely et al. |
| 2021/0055696 A1 | 2/2021 | Ely |
| 2021/0060783 A1 | 3/2021 | Bryner et al. |
| 2021/0096688 A1 | 4/2021 | Shedletsky et al. |
| 2021/0181682 A1 | 6/2021 | Ely et al. |
| 2021/0181688 A1 | 6/2021 | Ely et al. |
| 2021/0181690 A1 | 6/2021 | Rothkopf et al. |
| 2021/0181691 A1 | 6/2021 | Rothkopf et al. |
| 2021/0181692 A1 | 6/2021 | Rothkopf et al. |
| 2021/0181865 A1* | 6/2021 | Bushnell ............. G06F 3/03547 |
| 2021/0255590 A1 | 8/2021 | Ely et al. |
| 2021/0303081 A1 | 9/2021 | Kuboyama et al. |
| 2021/0353226 A1 | 11/2021 | Hiemstra |
| 2021/0373501 A1 | 12/2021 | Pandya et al. |
| 2021/0405594 A1 | 12/2021 | Holenarsipur et al. |
| 2022/0043397 A1 | 2/2022 | Ely et al. |
| 2022/0043402 A1 | 2/2022 | Roach et al. |
| 2022/0075328 A1 | 3/2022 | Taylor |
| 2022/0171344 A1 | 6/2022 | Rothkopf et al. |
| 2022/0261111 A1 | 8/2022 | Shedletsky et al. |
| 2022/0413446 A1 | 12/2022 | Rothkopf et al. |
| 2023/0028554 A1 | 1/2023 | Rothkopf et al. |
| 2023/0077241 A1 | 3/2023 | Pandya et al. |
| 2023/0097827 A1 | 3/2023 | Rothkopf et al. |
| 2023/0101015 A1 | 3/2023 | Ely et al. |
| 2023/0161299 A1 | 5/2023 | Beyhs |
| 2023/0213893 A1 | 7/2023 | Rothkopf et al. |
| 2023/0341819 A1 | 7/2023 | Ely et al. |
| 2023/0259235 A1 | 8/2023 | Shedletsky et al. |
| 2023/0393536 A1 | 12/2023 | Perkins et al. |
| 2023/0400818 A1 | 12/2023 | Davis et al. |
| 2023/0418230 A1 | 12/2023 | Ely et al. |

(56) References Cited

U.S. PATENT DOCUMENTS

| | | | |
|---|---|---|---|
| 2024/0036523 | A1 | 2/2024 | Pandya et al. |
| 2024/0045383 | A1 | 2/2024 | Roach et al. |
| 2024/0053707 | A1 | 2/2024 | Ely et al. |

FOREIGN PATENT DOCUMENTS

| | | |
|---|---|---|
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101641663 | 2/2010 |
| CN | 101750958 | 6/2010 |
| CN | 2016328168 | 11/2010 |
| CN | 101923314 | 12/2010 |
| CN | 102067070 | 5/2011 |
| CN | 102216959 | 10/2011 |
| CN | 202008579 | 10/2011 |
| CN | 102590925 | 7/2012 |
| CN | 102741772 | 10/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103919536 | 7/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 205121417 | 3/2016 |
| CN | 105547146 | 5/2016 |
| CN | 105556433 | 5/2016 |
| CN | 105683876 | 6/2016 |
| CN | 105683877 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 2018510451 | 4/2018 |
| CN | 209560397 | 10/2019 |
| CN | 209625187 | 11/2019 |
| CN | 114220694 | 3/2022 |
| CN | 106125968 | 11/2022 |
| DE | 2352016 | 4/1975 |
| DE | 3706194 | 9/1988 |
| DE | 102008023651 | 11/2009 |
| DE | 102016215087 | 3/2017 |
| EP | 016554 | 12/1985 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375995 | 10/2011 |
| EP | 2579186 | 4/2013 |
| EP | 2720129 | 4/2014 |
| EP | 2884239 | 6/2015 |
| FR | 2030093 | 10/1970 |
| FR | 2801402 | 5/2001 |
| GB | 887369 | 1/1962 |
| GB | 2433211 | 6/2007 |
| JP | S52151058 | 12/1977 |
| JP | S52164551 | 12/1977 |
| JP | S53093067 | 8/1978 |
| JP | S5478178 | 6/1979 |
| JP | S54087779 | 6/1979 |
| JP | S5708585 | 1/1982 |
| JP | S5734457 | 2/1982 |
| JP | S60103936 | 6/1985 |
| JP | S60103937 | 6/1985 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H07116141 | 5/1995 |
| JP | H0914941 | 1/1997 |
| JP | H10161811 | 6/1998 |
| JP | H11121210 | 4/1999 |
| JP | H11191508 | 7/1999 |
| JP | 2000258559 | 9/2000 |
| JP | 2000316824 | 11/2000 |
| JP | 2000337892 | 12/2000 |
| JP | 2001084934 | 3/2001 |
| JP | 20010030477 | 4/2001 |
| JP | 2001167651 | 6/2001 |
| JP | 2001202178 | 7/2001 |
| JP | 2001215288 | 8/2001 |
| JP | 2001289977 | 10/2001 |
| JP | 2001524206 | 11/2001 |
| JP | 2002071480 | 3/2002 |
| JP | 2002165768 | 6/2002 |
| JP | 2003036144 | 2/2003 |
| JP | 2003050668 | 2/2003 |
| JP | 2003151410 | 5/2003 |
| JP | 20033331693 | 11/2003 |
| JP | 2004184396 | 7/2004 |
| JP | 2004028979 | 11/2004 |
| JP | 2005017011 | 1/2005 |
| JP | 2005063200 | 3/2005 |
| JP | 2005099023 | 4/2005 |
| JP | 2005108630 | 4/2005 |
| JP | 2006101505 | 4/2006 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007285748 | 11/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |
| JP | 2009540399 | 11/2009 |

(56) References Cited

FOREIGN PATENT DOCUMENTS

| | | |
|---|---|---|
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2012053801 | 3/2012 |
| JP | 2012221905 | 11/2012 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 2014112222 | 6/2014 |
| JP | 2014174031 | 9/2014 |
| JP | 2017219448 | 12/2017 |
| KR | 200278568 | 3/2002 |
| KR | 20070011685 | 1/2007 |
| KR | 20070014247 | 2/2007 |
| KR | 100754674 | 9/2007 |
| KR | 20080028935 | 4/2008 |
| KR | 20080045397 | 5/2008 |
| KR | 100849684 | 8/2008 |
| KR | 1020080111563 | 12/2008 |
| KR | 2020100007513 | 7/2010 |
| KR | 20110011393 | 2/2011 |
| KR | 20110012784 | 2/2011 |
| KR | 20110103761 | 9/2011 |
| KR | 20110113368 | 10/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160017070 | 2/2016 |
| KR | 20160048967 | 5/2016 |
| KR | 20170106395 | 9/2017 |
| NL | 1040225 | 11/2014 |
| RO | 129033 | 11/2013 |
| TW | 200633681 | 10/2006 |
| WO | WO2001/022038 | 3/2001 |
| WO | WO2001/069567 | 9/2001 |
| WO | WO2003/032538 | 4/2003 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/034149 | 3/2015 |
| WO | WO2015/116111 | 8/2015 |
| WO | WO2015/122885 | 8/2015 |
| WO | WO2015/147756 | 10/2015 |
| WO | WO2016080669 | 5/2016 |
| WO | WO2016/104922 | 6/2016 |
| WO | WO2016/155761 | 10/2016 |
| WO | WO2016196171 | 12/2016 |
| WO | WO2016208835 | 12/2016 |
| WO | WO2017/013278 | 1/2017 |
| WO | WO2020173085 | 9/2020 |

OTHER PUBLICATIONS

Author Unknown, "Fossil Q ups smartwatch game with handsome design and build," Business Mirror, Makati City, Philippines, 3 pages, Dec. 20, 2016.

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551 &companyId=5394, 5 pages, Nov. 18, 2010.

Author Unknown, "MyKronoz ZeTime: World's Most Funded Hybrid Smartwatch Raised over $3M on Kickstarter, Running until April 27th," Business Wire, New York, New York, 3 pages, Apr. 21, 2017.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iphone and ipod touch," http://www.amazon.com/iPhone-Universal-Remote-Control-Accessory/dp/tech-data/B0038Z4 . . . , 2 pages, at least as early as Jul. 15, 2010.

Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.

Author Unknown, Vyzin Electronics Private Limited launches "Vesag Watch," http://www.virtualpressoffice.com/showJointPage.do?page=jp&showId=1544, 5 pages, Jan. 6, 2011.

Author Unknown, "Vyzin Unveiled Personal Emergency Response System (PERS) with Remote Health Monitoring That can be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.

Author Unknown, "DeskThorityNet, Optical Switch Keyboards," http://deskthority.net/keyboards-f2/optical-switch-keyboards-t1474.html, 22 pages, Jul. 11, 2015.

Epstein et al., "Economical, High-Performance Optical Encoders," Hewlett-Packard Journal, pp. 99-106, Oct. 1988. [text only version].

Greyb, "Google Watch: Convert your arm into a keyboard," http://www.whatafuture.com/2014/02/28/google-smartwatch/#sthash.Yk35cDXK.dpbs, 3 pages, Feb. 28, 2014.

IBM, "Additional Functionality Added to Cell Phone via "Learning" Function Button," www.ip.com, 2 pages, Feb. 21, 2007.

Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.

Krishnan et al., "A Miniature Surface Mount Reflective Optical Shaft Encoder," Hewlett-Packard Journal, Article 8, pp. 1-6, Dec. 1996.

Narayanaswami et al., "Challenges and considerations for the design and production of a purpose-optimized body-worn wristwatch computer," Defense, Security, and Cockpit Displays, 2004.

M.T. Raghunath et al., User Interfaces for Applications on a Wrist Watch, Personal and Ubiquitous Computing, vol. 6, No. 1, 2002, Springer.

Rick, "How VESAG Helps Health Conscious Citizens," http://sensetekgroup.com/2010/11/29/wireless-health-monitoring-system/, 2 pages, Nov. 29, 2010.

Sadhu, Rajendra, "How VESAG Helps People Who Want to 'Be There'?," http://ezinearticles.com/?How-Vesag-Helps-People-Who-Want-to-Be-There?&id=5423873, 1 page, Nov. 22, 2010.

Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.

Sherr, Sol, "Input Devices," p. 55, Mar. 1988.

Tran et al., "Universal Programmable Remote Control/Telephone," www.ip.com, 2 pages, May 1, 1992.

* cited by examiner

|  | FIG. 2A | FIG. 2B |
|---|---|---|
| 210A/211A | X | FIRST AMOUNT <X |
| 210B/211B | X | SECOND AMOUNT <X |
| 210C/211C | X | >X |

*FIG. 2C*

|           | FIG. 2A | FIG. 2C |
|-----------|---------|---------|
| 210A/211A | X       | <X      |
| 210B/211B | X       | <X      |
| 210C/211C | X       | <X      |

*FIG. 2E*

|        | FIG. 3A | 303 ROTATED IN DIRECTION 331 |
|--------|---------|------------------------------|
| 310A   | Y       | <Y                           |
| 310B   | Z       | >Z                           |
| 310C   | X       | <X                           |

*FIG. 3B*

CAPACITIVE GAP SENSOR RING FOR AN INPUT DEVICE

CROSS-REFERENCE TO RELATED APPLICATIONS

This application is a continuation patent application of U.S. patent application Ser. No. 17/187,429, filed Feb. 26, 2021, and titled "Capacitive Gap Sensor Ring for an Input Device", which is a continuation application of U.S. patent application Ser. No. 16/708,064, filed Dec. 9, 2019, and titled "Capacitive Gap Sensor Ring for an Input Device," now U.S. Pat. No. 10,955,937, issued Mar. 23, 2021, which is a continuation application of U.S. patent application Ser. No. 16/442,665, filed Jun. 17, 2019, and titled "Capacitive Gap Sensor Ring for an Input Device," now U.S. Pat. No. 10,509,486, issued Dec. 17, 2019, which is a continuation application of U.S. patent application Ser. No. 16/055,359, filed Aug. 6, 2018, and titled "Capacitive Gap Sensor Ring for an Input Device," now U.S. Pat. No. 10,379,629, issued Aug. 13, 2019, which is a continuation patent application of U.S. patent application Ser. No. 15/210,917, filed Jul. 15, 2016 and titled "Capacitive Gap Sensor Ring for an Input Device," now U.S. Pat. No. 10,061,399, issued Aug. 28, 2018, the disclosures of which are hereby incorporated herein by reference in their entirety.

FIELD

The described embodiments relate generally to input devices. More particularly, the present embodiments relate to a capacitive sensor that can detect multiple types of motion of an input device.

BACKGROUND

Electronic devices include a variety of different input and/or output devices for receiving input from and/or providing output to users. Examples of input and/or output devices include keyboards, touch screens, displays, joysticks, microphones, speakers, watch crowns, trackpads, track balls, and so on.

Some input devices include a moveable member and one or more sensors or other components that detect the movement of the moveable member. For example, keyboards may include a number of keycaps that can be pressed to activate one or more switches. Activating a switch may provide input to the electronic device.

SUMMARY

An input mechanism for a portable electronic device includes a manipulation mechanism, such as a cap or shaft that is moveable in multiple directions. The input mechanism also includes capacitive sensors arranged in multiple planes with respect to the manipulation mechanism that are associated with the multiple directions of movement. The capacitive sensors have first capacitive elements coupled to the manipulation mechanism, second capacitive elements, and a dielectric positioned between. Movement of the manipulation mechanism alters the positions of the first and second capacitive elements with respect to each other. The movement is determinable based on capacitance changes that result therefrom.

In various embodiments, a wearable electronic device has a multi-directional input device. The multi-directional input device includes a shaft, a cap operable to move with respect to the shaft, and a sensor coupling the cap to the shaft. The sensor includes an outer set of capacitive elements, an inner set of capacitive elements, a dielectric between the outer and inner sets of capacitive elements, and a returning structure. The returning structure is operable to allow movement of the outer set of capacitive elements with respect to the inner set of capacitive elements and return the outer set of capacitive elements to a default position. In some examples, the dielectric is the returning structure.

In some examples, a first element of the outer set of capacitive elements completely overlaps a first element of the inner set of capacitive elements. In other examples, a first element of the outer set of capacitive elements is offset from a first element of the inner set of capacitive elements by a first distance and a second element of the outer set of capacitive elements is offset from a second element of the inner set of capacitive elements by a second distance. The first and second distances may be different.

In numerous examples, the shaft is fixed. In other examples, the shaft is moveable.

In various examples, the dielectric is at least one of silicone or adhesive. In other examples, the dielectric is an air gap.

In some examples, the electronic device is operable to determine rotation of the cap with respect to the shaft, lateral translation of the cap with respect to the shaft, and horizontal translation of the cap with respect to the shaft. The electronic device may determine these movements based on capacitance changes between the outer and inner sets of capacitive elements.

In some embodiments, an electronic device has an input device. The input device includes a rotational manipulation mechanism, a first array of capacitive elements coupled to the manipulation mechanism, a second array of capacitive elements, and a dielectric that couples the first and second arrays of capacitive elements. The dielectric may operate as a seal for the electronic device. Movement of the manipulation mechanism generates capacitance changes between the first and second arrays of capacitive elements.

In various examples, the first array of capacitive elements is included in a first ring. In some implementations of such examples, the second array of capacitive elements is included in a second ring that is at least partially nested within the first ring.

In some examples, movement of the manipulation mechanism may alter at least one of a first overlap area or a first distance between a first pair of the first and second arrays of capacitive elements. Movement of the manipulation mechanism may also alter at least one of a second overlap area or a second distance between a second pair of the first and second arrays of capacitive elements. The first overlap area may be different from the second overlap area. The first distance may be different from the second distance.

In numerous examples, the manipulation mechanism is operable to rotate, press, and slide. In various examples, the first array of capacitive elements has a different number of elements than the second array of capacitive elements. In some examples, the first and second arrays of capacitive elements may experience a change in capacitance in response to a touch on the manipulation mechanism.

In numerous embodiments, an input device includes a fixed structure, a moveable member that is rotatable with respect to the fixed structure, a first set of conductors positioned around the moveable member, and a second set of conductors positioned around the fixed structure to define a gap between the first and second sets of conductors. Capacitance changes between the first and second sets of conductors indicate movement of the moveable element with respect to the fixed structure. At least one of the first set of conductors or the second set of conductors may be curved.

In some examples, a first conductor of the first set of conductors is transverse to a second conductor of the first set of conductors. In various implementations of such examples, a third conductor of the first set of conductors may be transverse to the second conductor of the first set of conductors.

In numerous implementations, the input device is a watch crown. In other implementations, the input device is a joystick. In yet other implementations, the input device may be a variety of different input devices.

BRIEF DESCRIPTION OF THE DRAWINGS

The disclosure will be readily understood by the following detailed description in conjunction with the accompanying drawings, wherein like reference numerals designate like structural elements.

FIG. 2C depicts a state table illustrating example changes in capacitance of capacitive sensors, with respect to FIGS. 2A and 2B.

FIG. 2E depicts a state table illustrating example changes in capacitance of capacitive sensors, with respect to FIGS. 2A and 2D.

FIG. 3B depicts a state table illustrating example changes in capacitance of capacitors, with respect to FIG. 3A and FIG. 3A with the cap rotated like shown in FIG. 2D.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and apparatuses that embody various elements of the present disclosure. However, it should be understood that the described disclosure may be practiced in a variety of forms in addition to those described herein.

The following disclosure relates to an input device that incorporates a moveable member. The moveable member can be manipulated in a variety of directions to provide input. The input device may also include one or more capacitive sensors with groups of capacitive elements positioned around the moveable member. Moving the moveable member may alter positions of some capacitive elements with respect to others, changing capacitances therebetween. The capacitance changes may be used to generate an input signal corresponding to the moveable member's motion.

In a particular embodiment, the sensor may be a ring or partial ring of capacitive elements. The capacitive elements may include an outer set of conductors that is separated from an inner set of conductors by a dielectric. Force exerted to move a shaft, cap, or other structure coupled to the sensor may change the relative position of one or more of the sets of conductors with respect to other sets, changing capacitances therebetween. The dielectric may facilitate the change in relative position, and may return the capacitive elements to a default position after the force stops.

Various embodiments detect movement in a variety of different directions. In some examples, this movement may include translation in one or more directions, rotation, tilt, and so on.

These and other embodiments are discussed below with reference to FIGS. 1-10. However, those skilled in the art will readily appreciate that the detailed description given herein with respect to these Figures is for explanatory purposes only and should not be construed as limiting.

Figure 1:
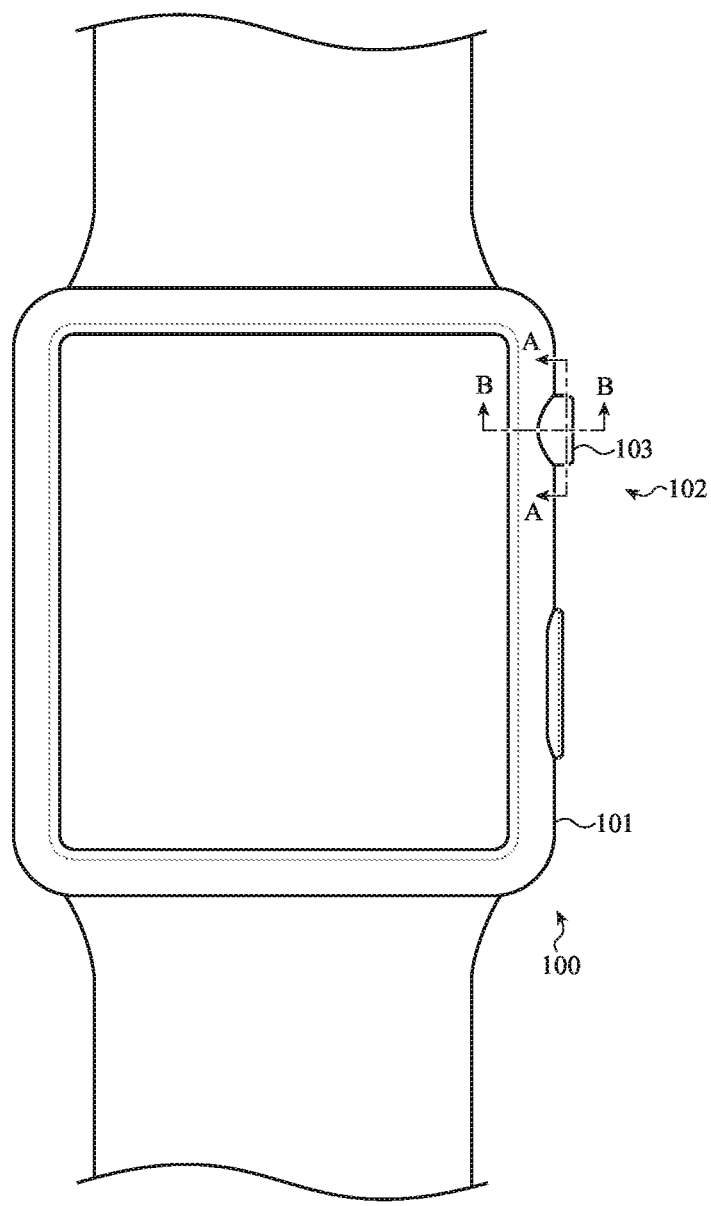
FIG. 1 depicts an electronic device having a multi-directional input device.

FIG. 1 depicts an electronic device 100 having a multi-directional input device 102, which may incorporate a capacitive sensor as described below. The multi-directional input device 102 may include a cap 103, crown, or other moveable member or rotational manipulation mechanism. The cap 103 may move in various directions when a user exerts force. For example, the cap 103 may rotate with respect to a housing 101 of the electronic device 100, press by translating horizontally toward and/or away from the housing 101, slide by laterally translating in one or more directions approximately parallel to the housing 101, tilt with respect to the housing 101, and so on. The multi-directional input device 102 includes one or more capacitive sensors that detect movement of the cap 103. Information about the movement may be determined based on one or more signals received from the capacitive sensor. For example, a type of motion, direction of motion, non-binary amount of force applied to cause the motion, and so on may be determined based on various capacitive sensor signals.

Figure 2A:
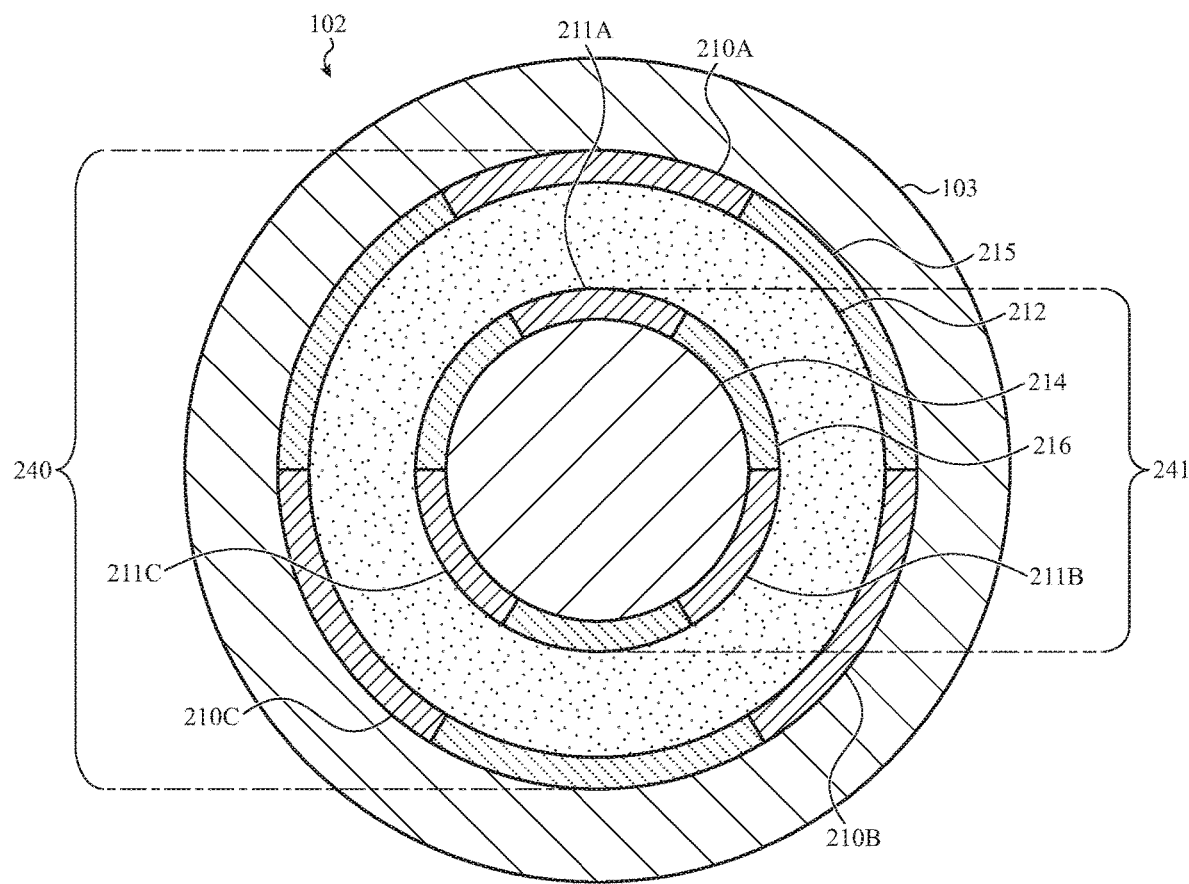
FIG. 2A depicts a first example cross-sectional view of the multi-directional input device of FIG. 1, taken along line A-A of FIG. 1.

FIG. 2A depicts a first example cross-sectional view of the multi-directional input device 102 of FIG. 1, taken along line A-A of FIG. 1. In this first example, a capacitive sensor includes an outer ring 240, including an outer set of capacitive elements 210A-210C (or a first array of capacitive elements, first set of conductors, and so on) and an inner ring 241, including an inner set of capacitive elements 211A-211C (or a second array of capacitive elements, second set of conductors, and so on). A dielectric 212 separates and couples the outer and inner sets of capacitive elements 210A-210C, 211A-211C, and defines a gap therebetween. The outer set of capacitive elements 210A-210C is coupled to the cap 103, crown, or other rotational manipulation mechanism and the inner set of capacitive elements 211A-211C is coupled to a fixed shaft 214 or other fixed structure or other component. The outer and inner rings 240, 241 also include a number of spacers 215, 216 (formed of insulating materials such as plastic, polymer, and so on) which respectively isolate the outer and inner sets of capacitive elements 210A-210C, 211A-211C from each other.

The multi-directional input device 102 may include a returning structure. The returning structure may allow the outer set of capacitive elements 210A-210C to move or otherwise alter their position with respect to the inner set of capacitive elements 211A-211C when the cap 103 moves under a force. The returning structure may also return the outer set of capacitive elements 210A-210C to their default positions after the exertion of the force. In this example, the returning structure may be the dielectric 212. The dielectric 212 may be a deformable material, such as silicone or other polymers, suitable gels, foams, adhesive, and so on. The deformable material may allow the outer set of capacitive elements 210A-210C to move or otherwise alter their position with respect to the inner set of capacitive elements 211A-211C and may return the outer set of capacitive elements 210A-210C to their default positions after the exertion of the force.

Movement of the outer set of capacitive elements 210A-210C with respect to the inner set of capacitive elements 211A-211C may change capacitances therebetween. The capacitance between the outer and inner sets of capacitive elements 210A-210C, 211A-211C may be affected by the amount of overlapping area, the distance between the outer and inner sets of capacitive elements 210A-210C, 211A-211C, and so on. In a first example, the outer set of capacitive elements 210A-210C entirely overlap the inner set of capacitive elements 211A-211C and are all the same distance apart. This corresponds to an absence of force exerted on the cap 103. Capacitances, and/or changes in capacitances, between the outer and inner sets of capacitive elements 210A-210C, 211A-211C may be monitored. Any changes in capacitances (or instantaneous values of capacitance) may be analyzed to determine a type of motion of the cap 103, direction of motion of the cap 103, non-binary amount of force applied to cause the motion of the cap 103, and/or other information about motion of the cap 103 with respect to the shaft 214.

Thus, the electronic device 100 (and/or processing unit or other controller thereof) may be operable to determine a variety of different movements of the cap 103 based on the capacitance changes. The electronic device 100 may determine rotation of the cap 103 with respect to the shaft 214 in one or more directions. The electronic device 100 may also determine translation of the cap 103 laterally and horizontally (in reference to FIG. 2A) with respect to the shaft 214 (e.g., in at least two transverse planes, such as a plane parallel to the housing 101 and a plane perpendicular to the housing 101).

The configuration of this first example multi-directional input device 102 may use a relatively small number of components without introducing excessive complexity. Further, the configuration of this first example multi-directional input device 102 may allow watertight or near-watertight sealing between the multi-directional input device 102 and the housing 101, restricting the passage of contaminants such as dust or liquid. In some implementations, the dielectric 212 and/or the sensor itself may function as such a seal or gasket. In other implementations, other seals, gaskets, and so on may also be included.

In some implementations, the outer set of capacitive elements 210A-210C may be drive elements and the inner set of capacitive elements 211A-211C may be sense elements. In other implementations, the drive and sense elements may be reversed. In still other implementations, the drive and sense elements may be intermixed among the outer and inner sets of capacitive elements 210A-210C, 211A-211C. In various implementations, drive elements may be passive.

In this example, the outer and inner sets of capacitive elements 210A-210C, 211A-211C are curved. Further, the outer and inner sets of capacitive elements 210A-210C, 211A-211C are positioned in multiple planes around the cap 103 in complete rings 240, 241, where the inner ring 241 is at least partially nested within the outer ring 240. For example, the outer capacitive element 210C is transverse to the outer capacitive element 210A (e.g., two different planes), which is itself transverse to the outer capacitive element 210B (e.g., a third plane). However, it is understood that this is an example. In various implementations, various capacitive elements may be positioned in different configurations without departing from the scope of the present disclosure, and/or may have any of a variety of shapes. For example, in some implementations, the outer and inner sets of capacitive elements 210A-210C, 211A-211C may be configured in partial rings rather than the complete outer and inner rings 240, 241 shown.

Figure 2B:
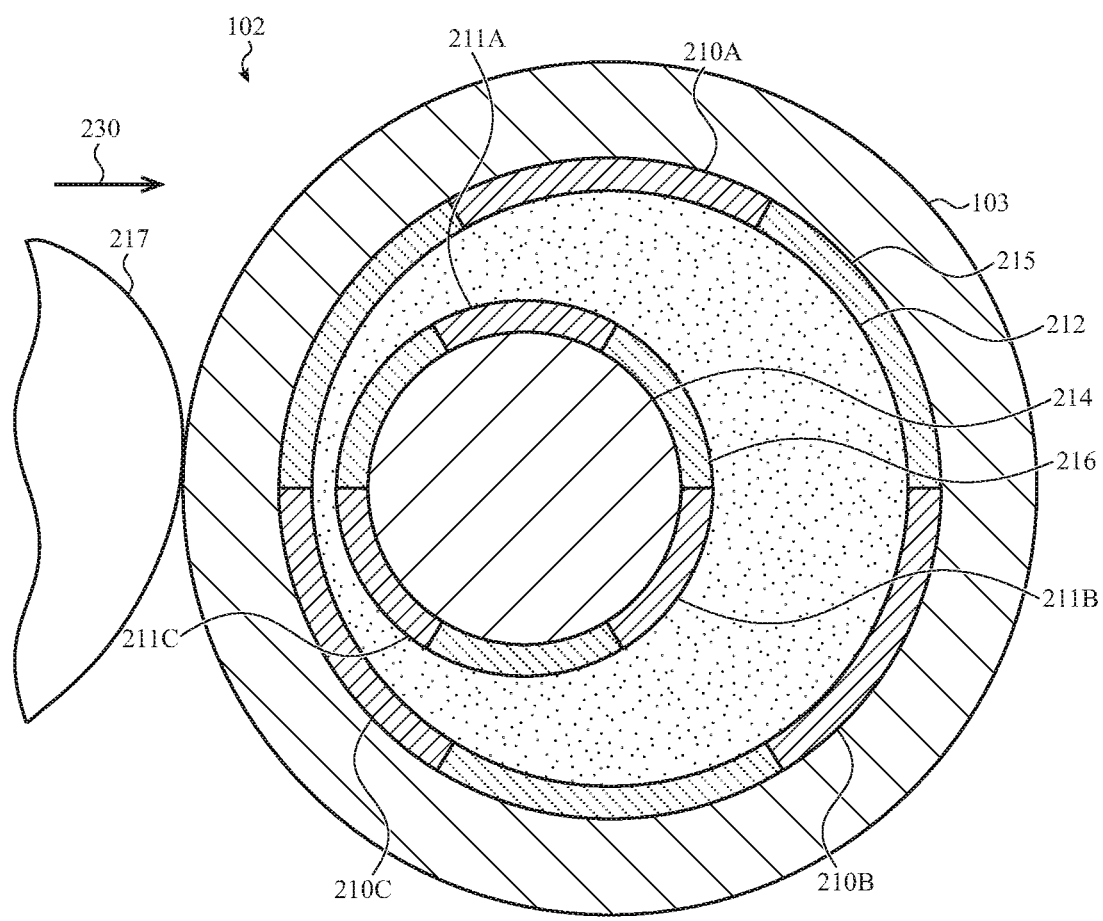
FIG. 2B depicts the multi-directional input device of FIG. 2A during translation.

Lateral motion of the cap 103 in a direction 230, or slide motion of the cap 103, will now be described in detail. FIG. 2B depicts the multi-directional input device 102 upon exertion of a force applied by a user 217. This force laterally translates the cap 103 in the direction 230 approximately parallel to the housing 101. Lateral translation causes the outer capacitive element 210A to shift with respect to the inner capacitive element 211A such that they are the same distance apart but have less overlapping area. Lateral translation also causes the outer capacitive element 210B to move apart from the inner capacitive element 211B such that they have the same overlapping area but the distance between has increased. Further, lateral translation causes the outer capacitive element 210C to approach the inner capacitive element 211C such that the overlapping area is the same but the distance between has decreased.

FIG. 2C depicts a state table illustrating example changes in capacitance between the outer and inner sets of capacitive elements 210A-210C, 211A-211C between the states shown in FIGS. 2A and 2B. The capacitances between the outer and inner sets of capacitive elements 210A-210C, 211A-211C in FIG. 2A are all the same value (represented as "X") because all of outer and inner sets of capacitive elements 210A-210C, 211A-211C are the same distance apart and have the same overlapping area. However, in FIG. 2B, the decreased overlapping area between the outer capacitive element 210A and the inner capacitive element 211A results in a first changed capacitance less than X. Further, the increased distance between the outer capacitive element 210B and the inner capacitive element 211B results in a second changed capacitance that is also less than X. Typically, although not necessarily, the values of the first and second changed capacitances are different. Additionally, the decreased distance between the outer capacitive element 210C and the inner capacitive element 211C results in a third changed capacitance that is greater than X.

These three changed capacitances may be analyzed and compared to each other. Based thereon, the electronic device 100 may determine that the cap 103 has laterally translated in the direction 230 shown in FIG. 2B. The electronic device 100 may also determine the non-binary amount of the force that caused the motion based on the magnitude of the capacitance changes and/or other capacitance change factors.

Although the above describes relative evaluation by looking at capacitive changes to determine motion, it is understood that this is an example. In some implementations, an absolute evaluation of a current capacitance may be used to determine movement without reference to an initial capacitance.

The electronic device 100 may analyze and compare the changed capacitances, or capacitance changes, in a variety of ways. For example, the electronic device 100 may consult one or more lookup tables stored in a non-transitory media in order to correlate the capacitance changes to various types of motion, direction of motion, amount of motion, amount of force, and so on. For example, decreased capacitance on only one side may indicate lateral motion in the opposite direction. By way of another example, decreased capacitance seen by all capacitive elements may indicate rotation.

FIG. 2B depicts left/right, with reference to FIG. 2B, lateral or slide motion of the cap 103. The cap 103 may also move laterally up/down (with reference to FIG. 2B) and this motion may be detected based on capacitances between the outer and inner sets of capacitive elements 210A-210C, 211A-211C. This lateral up/down motion may operate similarly to the left/right lateral motion described above. However, in some implementations, the two motions may be recognized as different types of input. In various implementations, different types of input may be recognized for each different way that the FIG. 2B depicts left/right, with reference to FIG. 2B, lateral or slide motion of the cap 103. The cap 103 may also move laterally up/down (with reference to FIG. 2B) and this motion may be detected based on capacitances between the outer and inner sets of capacitive elements 210A-210C, 211A-211C may move with respect to each other.

Figure 2D:
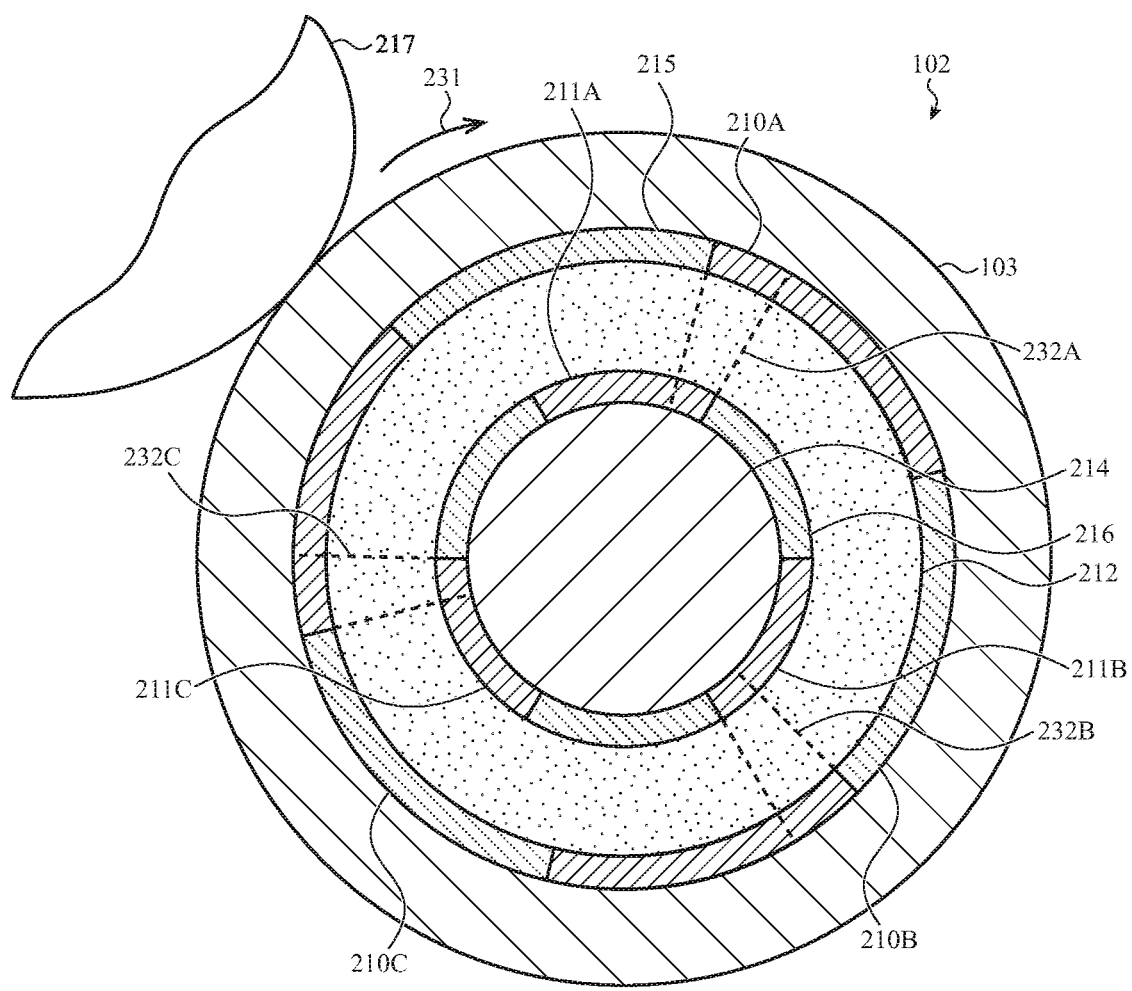
FIG. 2D depicts the multi-directional input device of FIG. 2A during rotation.

Rotation of the cap 103 will now be described in detail. FIG. 2D depicts the multi-directional input device 102 of FIG. 2A upon exertion of a force applied by a user 217 that rotates the cap 103 in a direction 231. This rotation causes all of the outer capacitive elements 210A-210C to shift with respect to the respective inner capacitive elements 211A-211C such that they are the same distance apart but have less overlapping area 232A-232C. FIG. 2E depicts a state table illustrating example capacitances between the outer and inner sets of capacitive elements 210A-210C, 211A-211C, as they are in the state shown in FIG. 2A and in that of FIG. 2D. As discussed above with respect to FIG. 2C, the capacitances between the outer and inner sets of capacitive elements 210A-210C, 211A-211C in FIG. 2A are all the same value, namely X. However, in FIG. 2D, the decreased overlapping area 232A-232C between the outer capacitive elements 210A-210C and the respective inner capacitive elements 211A-211C results in capacitances that are all less than X. These capacitances may be analyzed and compared to each other. Because all three capacitances decrease, the electronic device 100 may determine that the cap 103 has rotated.

In this example, the capacitance changes between the outer and inner capacitive elements 210A-210C, 211A-211C are entirely caused by the changing overlapping area 232A-232C due to rotation. In such a situation, the capacitance changes may not indicate the direction of the rotation as the same amount of rotation in either direction would result in the same change in overlapping area. However, a force exerted to rotate the cap 103 may also translate the cap 103 in a direction opposite the direction of the applied force, at least minimally. As such, gaps (distances) between one or more of the outer and inner capacitive elements 210A-210C, 211A-211C would change and the three capacitance changes would not be precisely identical. These differences between the three capacitances may be analyzed in order to determine the direction of the rotation based on where the gaps are increasing and/or decreasing.

Figure 3A:
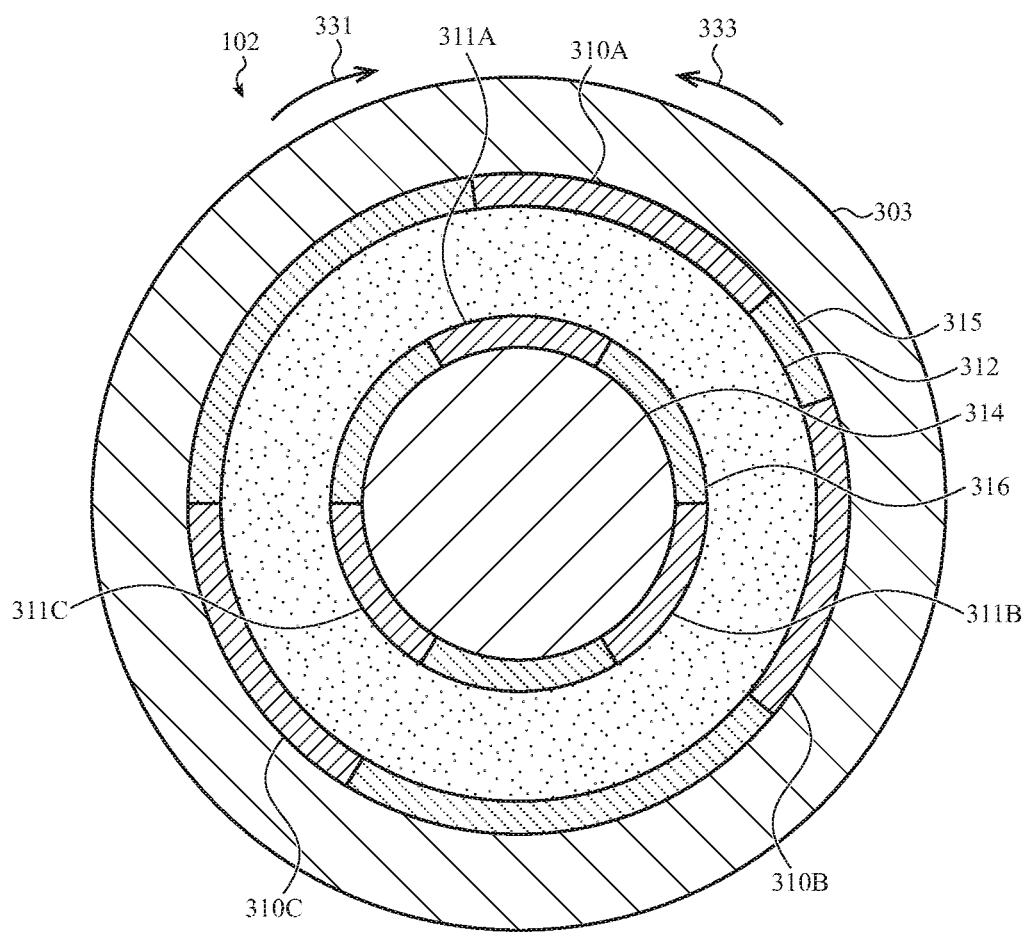
FIG. 3A depicts a second example cross-sectional view of the multi-directional input device of FIG. 2A, where outer and inner sets of capacitive elements are offset from each other.

In other implementations, other configurations may be utilized that result in different capacitance changes for different directions of rotation. For example, FIG. 3A depicts a second example cross-sectional view of the multi-directional input device 102 of FIG. 2A where a number of the outer and inner sets of capacitive elements 310A-310C, 311A-311C are offset from each other (e.g., from the respective associated capacitive element 310A-310C, 311A-311C). In this example, the outer capacitive element 310A is offset from the inner capacitive element 311A in a first direction 331 by a first distance whereas the outer capacitive element 310B is offset from the inner capacitive element 311B in an opposite direction 333 by a second distance. The first and second distances may be different. Thus, the capacitive elements 310A, 311A are offset differently than the capacitive elements 310B, 311B.

As a result, the overlapping area (and thus the capacitance) between the outer capacitive element 310A and the inner capacitive element 311A decreases if the cap 303 was rotated in the direction 331 and increases if the cap 303 was rotated in the opposite direction 333. Conversely, the overlapping area (and thus the capacitance) between the outer capacitive element 310B and the inner capacitive element 311B increases if the cap 303 was rotated in the direction 331 and decreases if the cap 303 was rotated in the opposite direction 333. Thus, the three capacitance changes may be analyzed to determine the rotation of the cap 303, the amount of rotation, and the direction of rotation.

FIG. 3B depicts a state table illustrating example changes in capacitance between the outer and inner sets of capacitive elements 310A-310C, 311A-311C between the state shown in FIG. 3A and the state when the cap 303 is rotated in the direction 331. The capacitances between the outer and inner sets of capacitive elements 310A-310C, 311A-311C in FIG. 3A are all different values (represented by "Y," "Z," and "X") because all of the outer and inner sets of capacitive elements 310A-310C, 311A-311C have different overlapping areas. However, upon rotation like shown in FIG. 2D, the further decreased overlapping area between the outer capacitive element 310A and the inner capacitive element 311A results in a capacitance less than Y. Conversely, the increased overlapping area between the outer capacitive element 310B and the inner capacitive element 311B results in a capacitance greater than Z. The decreased overlapping area between the outer capacitive element 310C and the inner capacitive element 311C is the same as in FIG. 2A, less than X.

Figure 4:
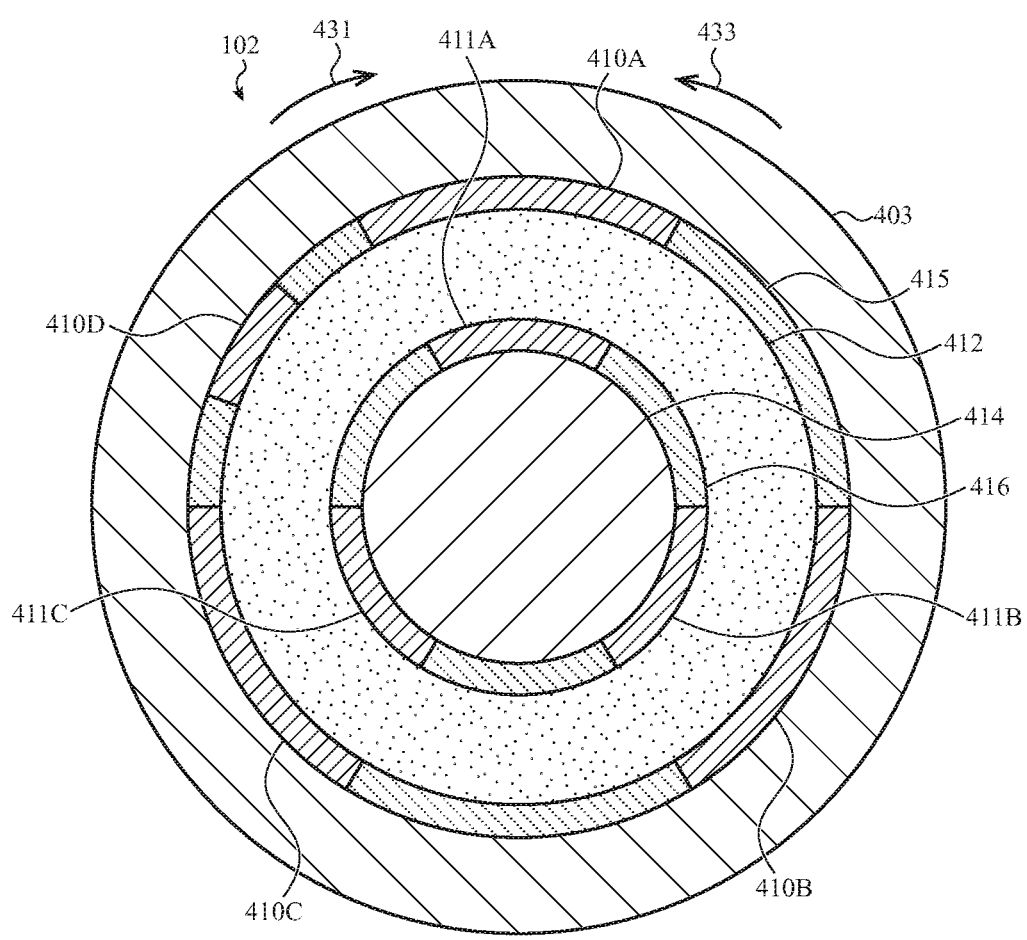
FIG. 4 depicts a third example cross-sectional view of the multi-directional input device of FIG. 2A where the outer set of capacitive elements includes more elements than the inner set of capacitive elements.

Although FIGS. 3A-3B illustrate an example configuration that results in different capacitance changes for different directions of rotation, other configurations are possible. For example, FIG. 4 depicts a third example cross-sectional view of the multi-directional input device 102 of FIG. 2A where the outer set of capacitive elements 410A-410D includes more elements than the inner set of capacitive elements 411A-411C.

In this third example, the additional capacitive element 410D may not (or may minimally) capacitively couple with any of the inner set of capacitive elements 411A-411C. However, when the cap 403 is rotated in the direction 431, the capacitive element 410D and the capacitive element 411A may capacitively couple as they begin to overlap. Based on this capacitive change, combined with the decreases in capacitance between the outer and inner sets of capacitive elements 410A-410C, 411A-411C due to the decreased overlap area between those elements, the electronic device 100 may determine that the cap 403 has rotated in the direction 431.

Conversely, when the cap 403 is rotated in the opposite direction 433, the capacitive element 410D may capacitively couple with the capacitive element 411C. As such, this capacitive change, combined with the decreases in capacitance between the outer and inner sets of capacitive elements 410A-410C, 411A-411C due to the decreased overlap area between those elements, indicates the rotation of the cap 403 in the opposite direction.

Figure 5:
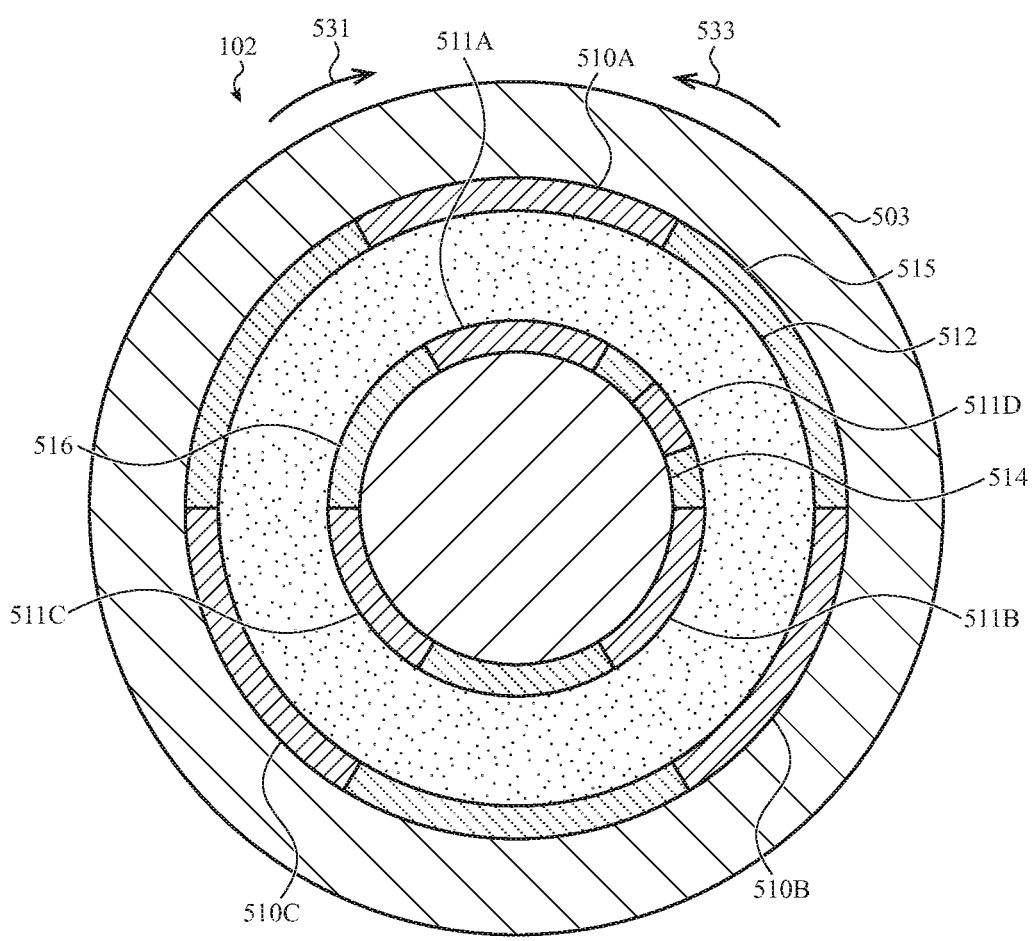
FIG. 5 depicts a fourth example cross-sectional view of the multi-directional input device of FIG. 2A where the inner set of capacitive elements includes more elements than the outer set of capacitive elements.

By way of another possible configuration, FIG. 5 depicts a fourth example cross-sectional view of the multi-directional input device 102 of FIG. 2A where the inner set of capacitive elements 511A-511D includes more elements than the outer set of capacitive elements 510A-510C. In this fourth example, the capacitive element 511D may not (or may minimally) capacitively couple with any of the outer set of capacitive elements 510A-510C. However, when the cap 503 is rotated in the direction 531, the capacitive element 511D and the capacitive element 510A may capacitively couple as they begin to overlap. Based on that capacitive change, combined with the decreases in capacitance between the outer and inner sets of capacitive elements 510A-510C, 511A-511C due to the decreased overlap area between those elements, the electronic device 100 may determine that the cap 503 has rotated in the direction 531.

Conversely, when the cap 503 is rotated in the opposite direction 533, the capacitive element 511D may overlap the capacitive element 510B. As such, the capacitive element 511D and the capacitive element 510B may capacitively couple. This capacitance change, combined with the decreases in capacitance between the outer and inner sets of capacitive elements 510A-510C, 511A-511C due to the decreased overlap area between those elements, indicates the rotation of the cap 503 in the opposite direction 533.

Figure 6A:
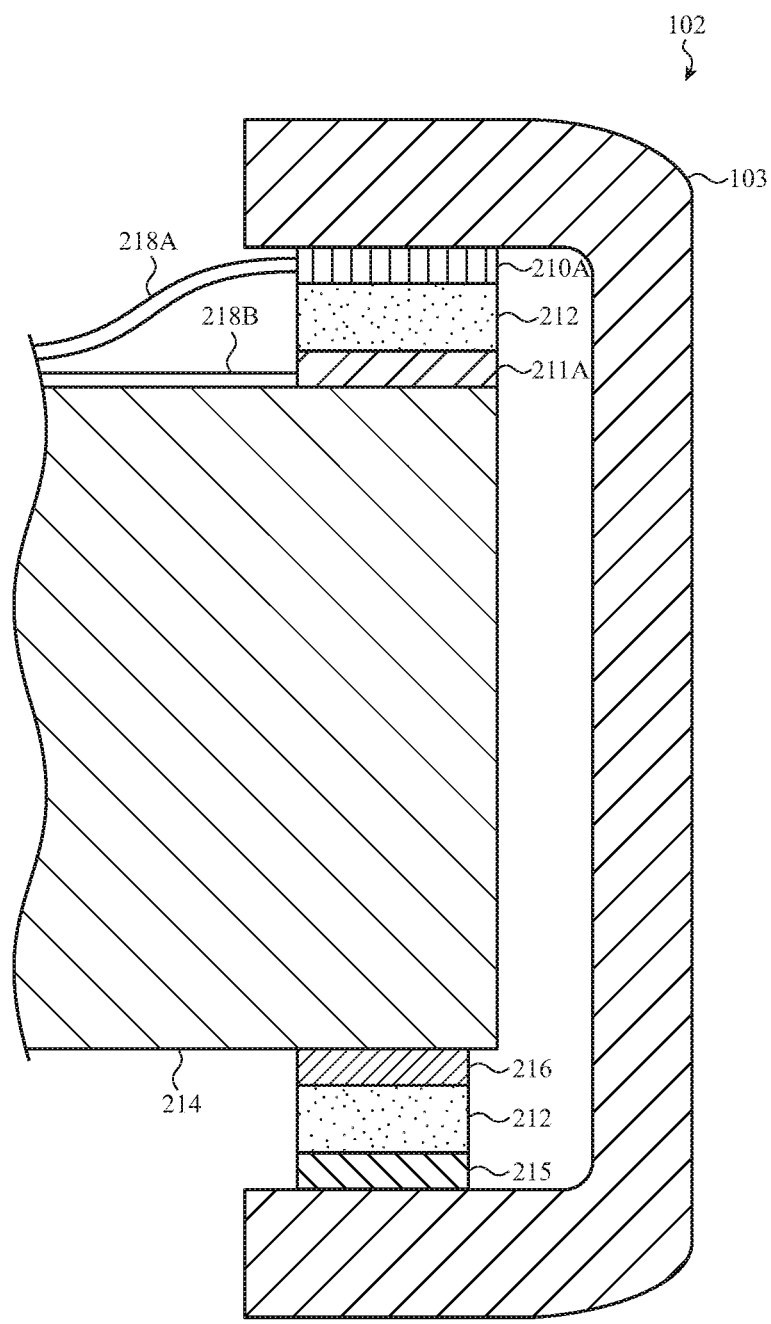
FIG. 6A depicts a second example cross-sectional view of the multi-directional input device of FIG. 1, taken along line B-B of FIG. 1.
Figure 6B:
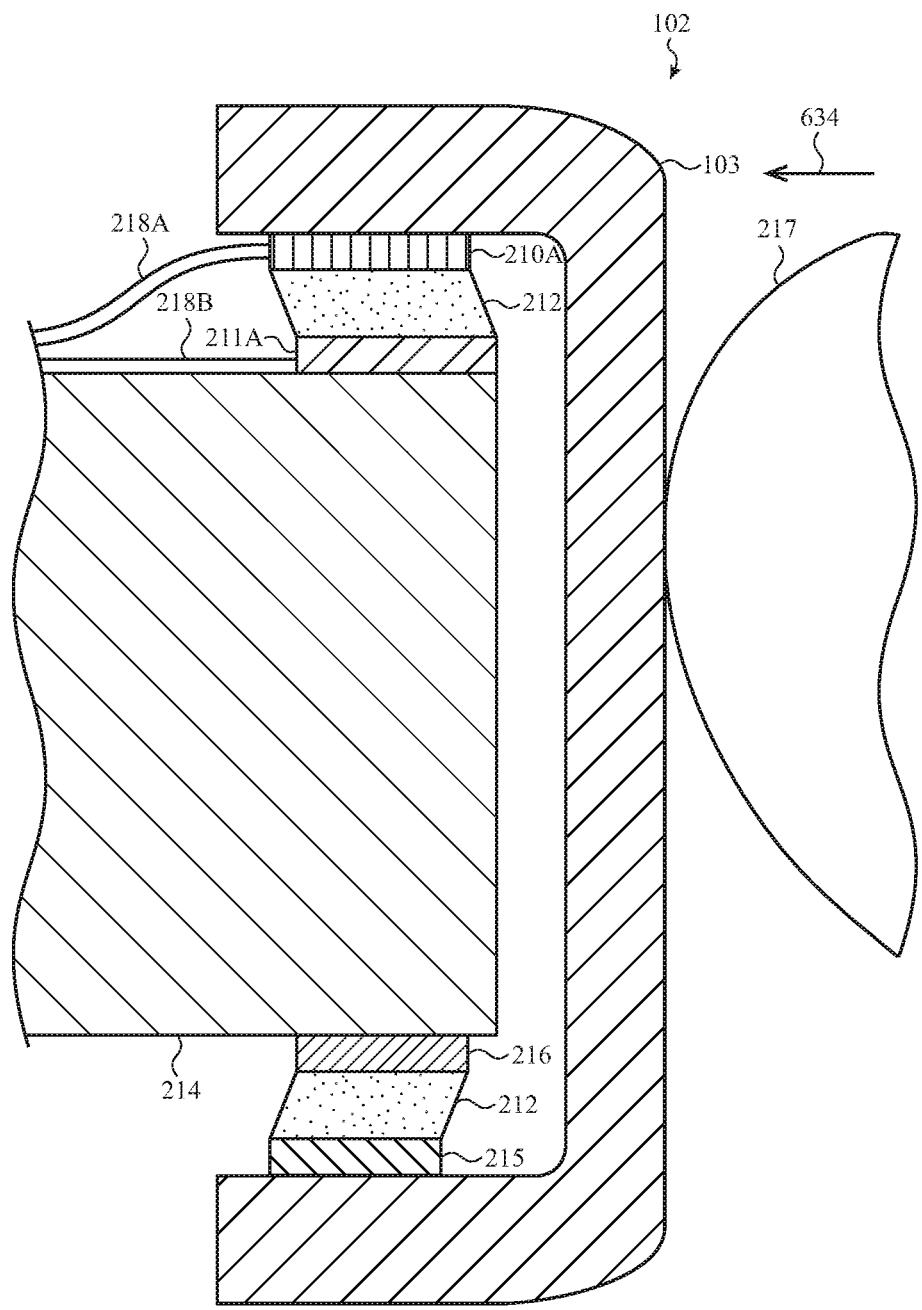
FIG. 6B depicts the multi-directional input device of FIG. 6A upon exertion of a force that translates the cap in a direction approximately perpendicular to the housing.

FIG. 6A depicts a second example cross-sectional view of the multi-directional input device 102 of FIG. 1, taken along line B-B of FIG. 1. As shown, one or more of the outer and inner sets of capacitive elements 210A-210C, 211A-211C may be connected to the electronic device 100 (and/or a component thereof, such as a processing unit or other controller) via flex circuits 218A, 218B and/or other conductive materials or communication connections. FIG. 6B depicts the multi-directional input device 102 of FIG. 6A upon exertion of a force by a user 217 that horizontally translates the cap 103 (e.g., in a direction 634 approximately perpendicular to the shaft 214). Horizontal translation of the cap 103 corresponds to a press motion. In this example, the cap 103 horizontally translates toward the shaft 214 and the housing.

Horizontal translation of the cap 103 toward the housing changes the position of the outer and inner sets of capacitive elements 210A-210C, 211A-211C with respect to each other as well as spacers 215, 216. The spacers 215, 216 are also separated by the dielectric 212, and may be omitted in some embodiments. Due to the relative change in position between the outer and inner sets of capacitive elements, the capacitances decrease because the overlapping area decreases. As such, the electronic device 100 may determine from the capacitance changes that the cap 103 has horizontally translated in a direction 634 approximately perpendicular to the housing 101.

However, as all of the outer and inner sets of capacitive elements change relative position by the same amount, the capacitance changes may be the same whether the cap 103 horizontally translates by the same amount toward or away from the housing. In various other implementations, the outer and inner sets of capacitive elements 210A-210C, 211A-211C may be configured such that capacitances change differently between the outer and inner sets of capacitive elements depending on whether the cap 103 moves toward or away from the housing 101. Such configurations may include offsetting one or more of the outer and inner sets of capacitive elements 210A-210C, 211A-211C with respect to each other, such as in the horizontal direction 634 (e.g., approximately perpendicular to the housing 101) and similar to the offsets depicted in the example of FIGS. 3A-3B.

Figure 7:
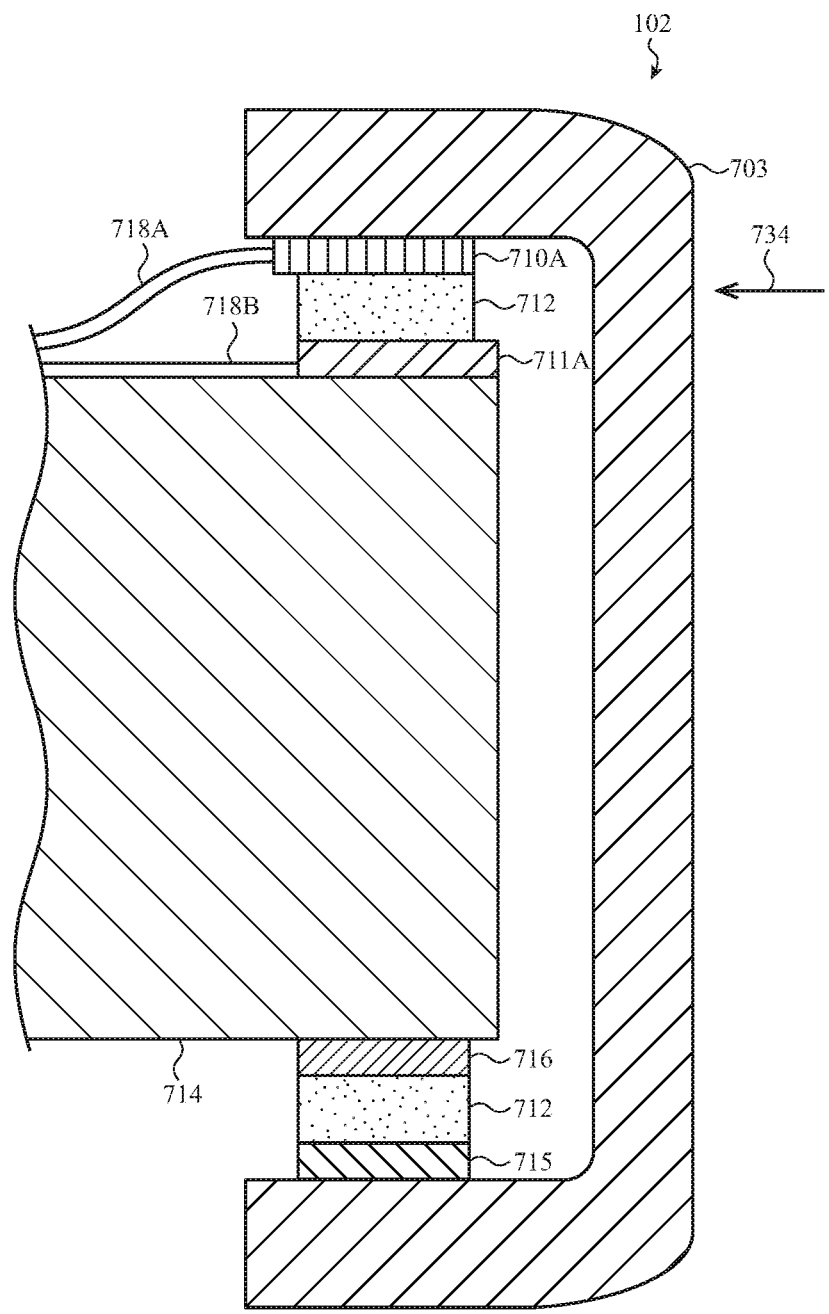
FIG. 7 depicts another example cross-sectional view of the multi-directional input device of FIG. 6A, where one or more of the outer and inner sets of capacitive elements are offset from each other.

For example, FIG. 7 depicts another example cross-sectional view of the multi-directional input device 102 of FIG. 6A where one or more of the outer and inner sets of capacitive elements 710A-710C, 711A-711C are horizontally offset from each other. As shown, the capacitive elements 710A, 711A are offset in a direction 734. As such, the capacitance between them will change differently depending on whether the cap 703 horizontally translates toward the shaft 714 or away from the shaft 714. In some implementations, one or more other of the outer and inner sets of capacitive elements 710B-710C, 711B-711C may be offset from each other, and may be offset differently than the capacitive elements 710A, 711A.

Although FIG. 7 illustrates an example configuration that results in different capacitance changes for translation toward and away from the housing 101, other configurations are possible. For example, one or more of the outer and inner sets of capacitive elements 710A-710C, 711A-711C may include one or more additional capacitive elements disposed closer to or further from the housing 101 than the outer and inner sets of capacitive elements 710A-710C, 711A-711C similar to the configurations depicted in the examples of FIGS. 4-5.

Additionally or alternatively, multiple rows of outer and inner sets of capacitive elements 210A-210C, 211A-211C may be utilized rather than the single row of outer and inner sets of capacitive elements 210A-210C, 211A-211C shown in FIGS. 2A and 6A-6B. In some examples, two rows of outer and inner sets of capacitive elements 210A-210C, 211A-211C may be positioned and separated from each other in the direction 634 such that the first row is closer to the housing 101 in the direction 634 than the second row. This may allow detection of whether the cap 103 moves towards or away from the shaft 214 based on capacitances between the outer and inner sets of capacitive elements 210A-210C, 211A-211C of the first and second rows. For example, the first row of the outer and inner sets of capacitive elements 210A-210C, 211A-211C and the second row of the outer and inner sets of capacitive elements 210A-210C, 211A-211C may each capacitively couple absent movement of the cap 103 towards or away from the shaft 214. However, these capacitances may decrease as the cap 103 moves towards or away from the shaft 214. Further, the outer capacitive elements 210A-210C of the first row may begin to capacitively couple with the inner capacitive elements 211A-211C of the second row when the cap 103 moves away from the housing 101. Similarly, the outer capacitive elements 210A-210C of the second row may begin to capacitively couple with the inner capacitive elements 211A-211C of the first row when the cap 103 moves toward from the housing 101.

Additionally, first and second rows of outer and inner sets of capacitive elements 210A-210C, 211A-211C may provide multiple sets of capacitances to evaluate. This may provide greater resolution in determining rotation, lateral translation, horizontal translation, and press of the cap 103 with respect to the housing 101.

Moreover, first and second rows of outer and inner sets of capacitive elements 210A-210C, 211A-211C may enable detection of tilt of the cap 103. If a force is exerted to tilt the cap 103 at an angle other than parallel or perpendicular with respect to the shaft 214, capacitances between some of the first and second rows of the outer and inner sets of capacitive elements 210A-210C, 211A-211C would increase due to increased proximity and/or overlap whereas capacitances between others would decrease due to decreased proximity and/or overlap. As the capacitance changes would be different depending on the direction in which the cap 103 was tilted, the capacitance changes may be evaluated to determine the direction and/or amount of the tilt.

Figure 8:
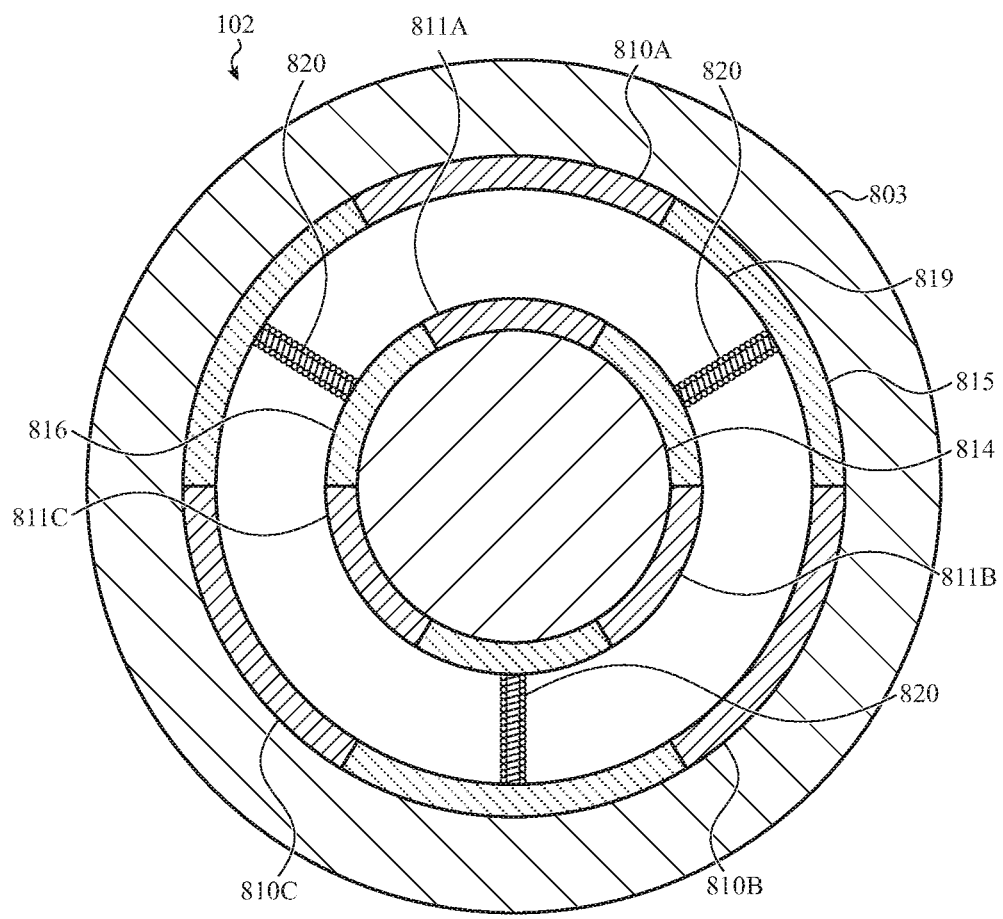
FIG. 8 depicts a fifth example cross-sectional view of the multi-directional input device of FIG. 2A where the dielectric is an air gap and a biasing mechanism.

FIG. 2A is illustrated and described as including a dielectric 212 that is a deformable material, such as silicone, adhesive, and so on. However, in other implementations, other dielectrics 212 may be used that may operate differently. For example, FIG. 8 depicts a fifth example cross-sectional view of the multi-directional input device 102 of FIG. 2A where the dielectric is an air gap 819 and the device incorporates a biasing mechanism 820.

In this fifth example, the outer and inner sets of capacitive elements 810B-810C, 811B-811C are not directly connected. Instead, they are separated by the air gap 819. Biasing mechanisms 820, such as springs or other elastic elements, couple the spacers 815 and 816. In this example, the biasing mechanisms 820 may be the returning mechanism. The biasing mechanisms 820 bias the outer and inner sets of capacitive elements 810B-810C, 811B-811C in the position shown and operate to return the outer and inner sets of capacitive elements 810B-810C, 811B-811C to the position shown when a force exerted on the cap 803 changes their position.

Figure 9:
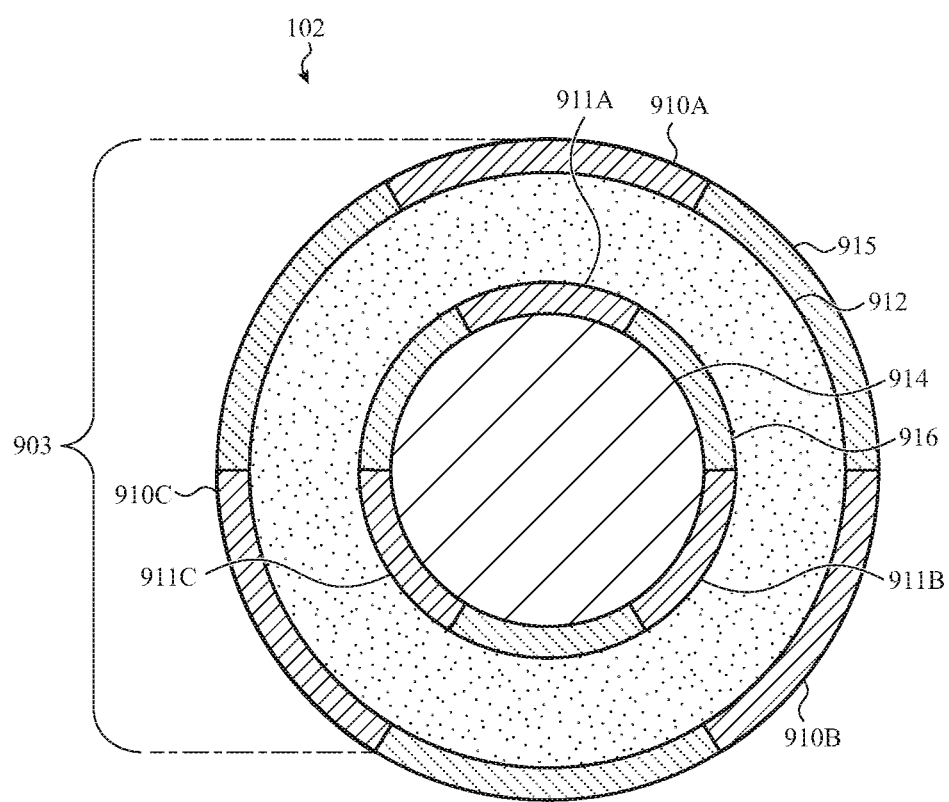
FIG. 9 depicts a sixth example cross-sectional view of the multi-directional input device of FIG. 2A where the outer ring forms the cap.

Further, FIG. 2A is illustrated and described with the cap 103 being separate from the outer ring 240 including the outer set of capacitive elements 210A-210C. However, in various implementations, the cap 103 may be omitted. For example, FIG. 9 depicts a sixth example cross-sectional view of the multi-directional input device 102 of FIG. 2A where the outer ring forms the cap 903.

In this example, the outer ring of the sensor may be directly manipulated by a user to move with respect to the housing 101. As the user or other object contacts the outer ring of the sensor, the user may directly contact one or more of the outer set of capacitive elements 910A-910C. This may influence the capacitances between the outer and inner sets of capacitive elements 910B-910C, 911B-911C. The electronic device 100 may analyze the capacitance changes caused by the user contacting one or more of the outer set of capacitive elements 910A-910C in order to determine various characteristics of movement of the cap 903.

For example, the outer set of capacitive elements 910A-910C may be sense elements. As such, contact by the user with one or more of the outer set of capacitive elements 910A-910C may short the respective element. Based on the detected short, the electronic device 100 may determine a touch location, or where the user is touching the cap. The electronic device 100 may scale and/or otherwise vary how the electronic device 100 interprets the capacitive changes between the outer and inner sets of capacitive elements 910B-910C, 911B-911C based on the detected touch location.

For example, if analysis of the capacitive changes could indicate translation in two opposing directions, the electronic device 100 may determine the cap has translated in the direction opposite the touch location. This is because a user would likely have been unable to move the cap without pushing on the cap from the opposing side.

Additionally, the multi-directional input device 102 of FIG. 2A is described as having a fixed shaft 214. However, in various implementations, the shaft 214 may be operable to move in one or more directions. In some implementations, the shaft 214 may be operable to spin freely. In other implementations, the shaft 214 may be operable to move in response to an additional force exerted on the cap 103 that is greater than the force that moves the outer and inner sets of capacitive elements 910B-910C, 911B-911C.

For example, the shaft 214 may be frictionally mounted, such as with bearings. The frictional mounting may resist more force than does the dielectric 212. The outer and inner sets of capacitive elements 910B-910C, 911B-911C may move with respect to each other under a lesser amount of force than moves the shaft 214. In other words, the outer and inner sets of capacitive elements 910B-910C, 911B-911C may move with respect to each other when a force is exerted. When the force increases sufficiently to also move the shaft 214, the shaft 214 may also move.

FIG. 2A is illustrated and described as a watch crown or similar multi-directional input device 102. However, it is understood that this is an example. In other implementations, the techniques discussed herein may be used with a variety of different input and/or output mechanisms.

For example, a joystick or similar rotational or other input mechanism may include a sensor (such as the one depicted in FIG. 2A) which may be positioned around a shaft (like the shaft 214 in FIG. 2A) that is moveable with respect to a fixed outer element (positioned similarly to the cap 103 in FIG. 2A). Movement of the shaft with respect to the fixed outer element may alter the position of the first and second arrays or sets of capacitive elements or conductors. As such, capacitive differences between the first and second arrays or sets of capacitive elements or conductors may be analyzed and compared to determine movement of the shaft.

By way of another example, a track ball or similar rotational or other input mechanism may include a sensor positioned around a moveable mechanism, such as a sphere or similar element. The sphere may be moveable with respect to a fixed outer element. Movement of the sphere with respect to the fixed outer element, which may be omnidirectional in some implementations, may alter the position of first and second arrays or sets of capacitive elements or conductors, altering capacitive differences that may be analyzed and compared to determine movement of the sphere.

FIG. 2A is illustrated and described as a multi-directional input device 102 that includes capacitive sensors. However, it is understood that this is an example. In other implementations, other kinds of sensors, such as strain gauges, may be used without departing from the scope of the present disclosure.

Further, FIG. 2A is illustrated and described as the outer and inner sets of capacitive elements 210A-210C, 211A-211C being curved and being components of outer and inner rings 240 and 241. However, in various implementations, the outer and inner sets of capacitive elements 210A-210C, 211A-211C may be otherwise configured. For example, the outer and inner sets of capacitive elements 210A-210C, 211A-211C may be flat and may be components of square or other shaped elements rather than the outer and inner rings 240 and 241.

Figure 10:
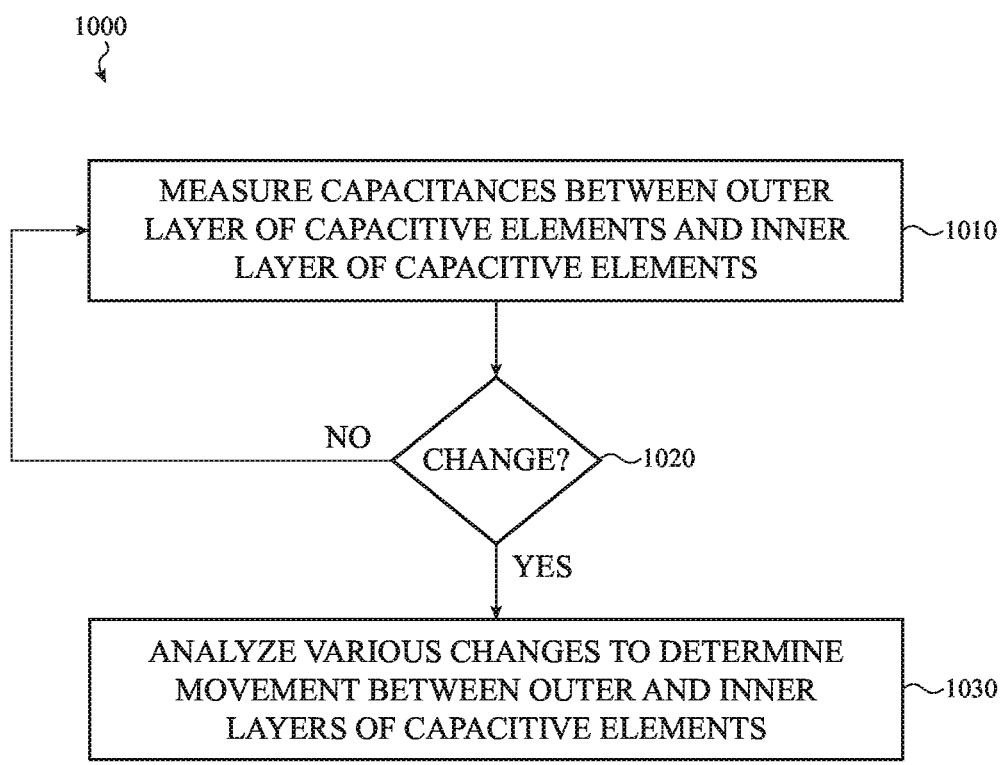
FIG. 10 depicts a flow chart illustrating an example method for operating a capacitive sensor for a directional input device. This example method may be performed by the multi-directional input devices of FIGS. 1-9.

FIG. 10 depicts a flow chart illustrating an example method 1000 for operating a capacitive sensor for a directional input device. This example method 1000 may be performed by the multi-directional input devices of FIGS. 1-9.

At 1010, capacitances between one or more of an outer layer of capacitive elements and an inner layer of capacitive elements may be measured. The layers of capacitive elements may be operable to move with respect to each other based on force exerted on an input mechanism. Movement of the layers of capacitive elements with respect to each other may alter the capacitances.

At 1020, it may be determined whether or not the capacitances have changed. This determination may be performed by a processing unit or other controller that receives signals from a sensor which includes the layers of capacitive elements. If not, the flow returns to 1010 where the capacitances continue to be measured. Otherwise, the flow proceeds to 1030.

At 1030, the various capacitance changes are analyzed and/or compared to determine movement between the outer and inner layers of capacitive elements. This analysis and/or comparison may be performed by a processing unit or other controller. Movement of an input mechanism associated with the layers of capacitive elements may be determined based on the movement of the layers of capacitive elements.

Although the example method 1000 is illustrated and described as including particular operations performed in a particular order, it is understood that this is an example. In various implementations, various orders of the same, similar, and/or different operations may be performed without departing from the scope of the present disclosure.

For example, in some implementations, the example method 1000 may include the additional operation of determining a non-binary amount of the force that was applied to cause the movement of the layers of capacitive elements. In such implementations, the non-binary amount of applied force may be determined based on the capacitance changes.

By way of another example, the layers of capacitive elements are described as outer and inner layers of capacitive elements. However, in various implementations, first or second sets or arrays of capacitive elements or other conductors may be utilized in configurations that are not "outer" or "inner" with respect to each other. In some implementations, the first or second sets or arrays of capacitive elements or other conductors may be adjacent rather than nested or otherwise similarly situated.

Returning to FIG. 1, the electronic device 100 is shown as a wearable electronic device including a display that is coupleable to a user using a band or other attachment mechanism. However, it is understood that this is an example. In various implementations, the electronic device 100 may be any kind of electronic device without departing from the scope of the present disclosure. For example, the electronic device 100 may be a laptop computing device, a smart phone, a desktop computing device, a mobile computing device, a display, a cellular telephone, a digital media player, a fitness monitor, a printer, a tablet computing device, and so on.

Further, the electronic device 100 may include additional components not shown without departing from the scope of the present disclosure. In various examples, the electronic device 100 may include one or more processing units, communication components, sensors, non-transitory storage media (which may take the form of, but is not limited to, a magnetic storage medium; optical storage medium; magneto-optical storage medium; read only memory; random access memory; erasable programmable memory; flash memory; and so on), input/output components, and so on.

As described above and illustrated in the accompanying figures, the present disclosure relates to a capacitive sensor for a directional input device. The input device may include a moveable member that can be manipulated to provide input. The input device may also include one or more sensors with groups of capacitive elements configured in multiple planes around the moveable member. Movement of the moveable member may alter positions of various of the groups of capacitive elements with respect to each other, changing capacitances therebetween. Information about that movement may then be determined based at least on the capacitance changes.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device comprising:
 a housing;
 a force-sensitive input system coupled to the housing and comprising:
  an input member external to the housing and configured to receive:
   a first input resulting in a first force acting on the input member in a first direction; and a second input resulting in a second force acting on the input member in a second direction different from the first direction;
a first set of conductors coupled to the input member;
a deformable material; and
a second set of conductors separated from the first set of conductors by the deformable material and configured to move relative to the first set of conductors in response to the first input and the second input; and
a processing unit operably coupled to the first set of conductors and the second set of conductors and configured to determine, based at least in part on a change in an electrical property detected at least one of the first set of conductors or the second set of conductors:
a first force value associated with the first force; and
a second force value associated with the second force.

2. The electronic device of claim 1, wherein:
the electronic device is a watch;
the watch further comprises a band coupled to the housing and configured to attach the watch to a user; and
the input member is a crown positioned along a side of the housing.

3. The electronic device of claim 1, wherein:
the first input causes the input member to rotate relative to the housing; and
the second input causes the input member to translate relative to the housing.

4. The electronic device of claim 1, wherein:
the force-sensitive input system further comprises a shaft coupled to the housing; and
the deformable material couples the input member to the shaft.

5. The electronic device of claim 4, wherein the second set of conductors is coupled to the shaft.

6. The electronic device of claim 1, wherein the change in the electrical property is a change in capacitance between at least one conductor of the first set of conductors and at least one conductor of the second set of conductors.

7. The electronic device of claim 1, wherein:
the first input causes the input member to rotate from a first rotational position to a second rotational position;
the first input causes the deformable material to deform; and
the deformable material imparts a returning force on the input member to return the input member to the first rotational position.

8. An electronic device comprising:
a housing;
an input member coupled to the housing and comprising a cap configured to move relative to the housing in response to an input applied to the cap;
a first ring of capacitive elements coupled to the cap, the first ring of capacitive elements comprising a first set of conductors;
a second ring of capacitive elements separated from the first ring of capacitive elements by a deformable material and fixed relative to the housing, the second ring of capacitive elements comprising a second set of conductors; and
a processing unit configured to determine a force associated with the input based at least in part on a change in capacitance between a conductor of the first set of conductors and a conductor of the second set of conductors.

9. The electronic device of claim 8, wherein the change in capacitance is caused by a change in an offset between the conductor of the first set of conductors and the conductor of the second set of conductors.

10. The electronic device of claim 8, wherein:
the input is a first input causing the cap to move in a first direction relative to the housing;
the force is a first force;
the change in capacitance is a first change in capacitance;
the cap is configured to move in a second direction relative to the housing in response to a second input applied to the cap, the second direction different from the first direction; and
the processing unit is further configured to determine a second force associated with the second input based at least in part on a second change in capacitance between the conductor of the first set of conductors and the conductor of the second set of conductors.

11. The electronic device of claim 10, wherein:
the first direction includes a rotation of the cap relative to the housing; and
the second direction includes a translation of the cap relative to the housing.

12. The electronic device of claim 11, wherein:
the rotation is a rotation about a rotational axis of the cap; and
the translation is a translation parallel to the rotational axis of the cap.

13. The electronic device of claim 8, wherein:
the electronic device further comprises a shaft fixed relative to the housing; and
the second ring of capacitive elements is coupled to the shaft.

14. The electronic device of claim 13, wherein:
the deformable material is coupled to the shaft and the cap; and
the deformable material is a deformable dielectric material.

15. A force-sensing input system comprising:
a fixed member;
a first array of capacitive elements coupled to the fixed member;
an input member coupled to the fixed member, the input member configured to receive:
a first input resulting in the input member moving in a first direction relative to the fixed member; and
a second input resulting in the input member moving in a second direction, different from the first direction, relative to the fixed member;
a second array of capacitive elements coupled to the input member;
a deformable material coupling the fixed member and the input member and configured to deform in response to the first input and the second input; and
a processing unit configured to determine:
a first force value associated with the first input based at least in part on a first change in capacitance between the first array of capacitive elements and the second array of capacitive elements; and
a second force value associated with the second input based at least in part on a second change in capacitance between the first array of capacitive elements and the second array of capacitive elements.

16. The force-sensing input system of claim 15, wherein:
the first input results in the input member rotating from an initial position to a rotated position relative to the fixed member; and the second input results in the input member translating from the initial position to a translated position relative to the fixed member.

17. The force-sensing input system of claim 16, wherein the deformable material imparts a returning force on the input member to return the input member to the initial position.

18. The force-sensing input system of claim 17, wherein the deformable material is a polymer.

19. The force-sensing input system of claim 15, wherein:
the first change in capacitance results from a change in overlap of a first capacitive element of the first array of capacitive elements and a second capacitive element of the second array of capacitive elements; and
the second change in capacitance results from a change in distance between a third capacitive element of the first array of capacitive elements and a fourth capacitive element of the second array of capacitive elements.

20. The force-sensing input system of claim 19, wherein:
the input member is further configured to receive a third input resulting in the input member moving in a third direction, different from the first direction and the second direction, relative to the fixed member; and
the processing unit is further configured to determine a third force value associated with the third input based at least in part on a third change in capacitance between the first array of capacitive elements and the second array of capacitive elements.

* * * * *